(12) United States Patent
LaBrie et al.

(10) Patent No.: US 12,093,611 B2
(45) Date of Patent: Sep. 17, 2024

(54) SYSTEMS AND METHODS FOR CONTROLLING PREDICTIVE MODELING PROCESSES ON A MOBILE DEVICE

(71) Applicant: Compass Point Retirement Planning, Inc., Wakefield, MA (US)

(72) Inventors: Michael James LaBrie, Marblehead, MA (US); Mark E. Buckley, Billerica, MA (US)

( * ) Notice: Subject to any disclaimer, the term of this patent is extended or adjusted under 35 U.S.C. 154(b) by 967 days.

(21) Appl. No.: 17/096,219

(22) Filed: Nov. 12, 2020

(65) Prior Publication Data
US 2021/0173975 A1 Jun. 10, 2021

Related U.S. Application Data

(60) Provisional application No. 62/935,775, filed on Nov. 15, 2019.

(51) Int. Cl.
*G06F 30/20* (2020.01)
*G06F 111/08* (2020.01)

(52) U.S. Cl.
CPC .......... *G06F 30/20* (2020.01); *G06F 2111/08* (2020.01)

(58) Field of Classification Search
CPC ...... G06F 30/20; G06F 2111/08; G06Q 40/06
See application file for complete search history.

(56) References Cited

U.S. PATENT DOCUMENTS

| | | | |
|---|---|---|---|
| 4,742,457 A | 5/1988 | Leon et al. | |
| 7,577,597 B1 | 8/2009 | Allison et al. | |
| 7,778,907 B1 | 8/2010 | Haskins | |
| 7,813,985 B2 | 10/2010 | O'Flinn et al. | |
| 7,974,898 B2 | 7/2011 | Arena et al. | |

(Continued)

FOREIGN PATENT DOCUMENTS

| | | |
|---|---|---|
| KR | 20010034989 | 5/2001 |
| WO | 2014004354 | 1/2014 |

OTHER PUBLICATIONS

Terefe, Mati B., Heezin Lee, Nojung Heo, Geoffrey C. Fox, and Sangyoon Oh. "Energy-efficient multisite offloading policy using Markov decision process for mobile cloud computing." Pervasive and Mobile Computing 27 (2016): 75-89. (Year: 2016).*

(Continued)

*Primary Examiner* — Eunhee Kim
(74) *Attorney, Agent, or Firm* — Plumsea Law Group, LLC

(57) ABSTRACT

Embodiments provide mobile computing devices, related systems, and methods for controlling predictive modeling processes on a mobile device. An embodiment may provide a method for controlling predictive modeling processes on a mobile device, which may include receiving modeling data associated with a predictive model, receiving computation resources data of the mobile device, determining one or more predictive model processing parameters of the predictive model based on the modeling data and the computation resources data, formulating processing instructions based on the one or more predictive model processing parameters, and sending the modeling data and the processing instructions to the mobile device for execution of the predictive model. The parameters may include aspects of a sufficient number of tests, a type of predictive modeling simulation technique, client/server processing, and/or device responsive rendering.

20 Claims, 31 Drawing Sheets

(56) References Cited

U.S. PATENT DOCUMENTS

| | | | |
|---|---|---|---|
| 8,015,092 B2 | 9/2011 | Tatro et al. | |
| 8,095,397 B2 | 1/2012 | Gray et al. | |
| 8,103,571 B2 | 1/2012 | Tatro et al. | |
| 8,121,924 B1 | 2/2012 | Leon et al. | |
| 8,209,197 B2 | 6/2012 | Tatro et al. | |
| 8,341,063 B1 * | 12/2012 | Cernyar | G06Q 40/06 705/36 R |
| 2003/0033587 A1 | 2/2003 | Ferguson et al. | |
| 2004/0172352 A1 * | 9/2004 | Deretz | G06Q 40/08 705/36 R |
| 2006/0095351 A1 | 5/2006 | Gershenfeld et al. | |
| 2006/0206398 A1 | 9/2006 | Coughlin | |
| 2007/0100720 A1 | 5/2007 | Bonvouloir | |
| 2008/0114703 A1 | 5/2008 | Dahlberg et al. | |
| 2008/0133280 A1 | 6/2008 | Ziegler | |
| 2008/0189220 A1 | 8/2008 | Herschler et al. | |
| 2009/0198522 A1 | 8/2009 | Mocciolo et al. | |
| 2009/0254469 A1 | 10/2009 | Robertson | |
| 2010/0174666 A1 | 7/2010 | Brandes et al. | |
| 2010/0332365 A1 | 12/2010 | O'Donnell et al. | |
| 2011/0035239 A1 | 2/2011 | Scheinerman et al. | |
| 2011/0112947 A1 | 5/2011 | Liautaud, Sr. et al. | |
| 2014/0101073 A1 | 4/2014 | LaBrie | |
| 2015/0242951 A1 * | 8/2015 | Pillai | G06Q 40/06 705/36 R |
| 2016/0358265 A1 | 12/2016 | LaBrie | |
| 2018/0018683 A1 * | 1/2018 | Yee | G06Q 10/02 |
| 2020/0380605 A1 | 12/2020 | LaBrie | |
| 2023/0071367 A1 | 3/2023 | LaBrie | |

OTHER PUBLICATIONS

Amoretti, Michele, Alessandro Grazioli, and Francesco Zanichelli. "A modeling and simulation framework for mobile cloud computing." Simulation modelling practice and theory 58 (2015): 140-156. (Year: 2015).*

Khanna, Abhirup, Archana Kero, and Devendra Kumar. "Mobile cloud computing architecture for computation offloading." In 2016 2nd International Conference on Next Generation Computing Technologies (NGCT), pp. 639-643. IEEE, 2016. (Year: 2016).*

Xia, Feng, Fangwei Ding, Jie Li, Xiangjie Kong, Laurence T. Yang, and Jianhua Ma. "Phone2Cloud: Exploiting computation offloading for energy saving on smartphones in mobile cloud computing." Information Systems Frontiers 16 (2014): 95-111. (Year: 2014).*

Colom JF, Gil D, Mora H, Volckaert B, Jimeno AM. Scheduling framework for distributed intrusion detection systems over heterogeneous network architectures. Journal of Network and Computer Applications. Apr. 15, 2018;108:76-86. (Year: 2018).*

Darla Mercado, "4% withdrawal rule called into question", Jan. 22, 2012, Investment News, http://www.investmentnews.com/article/20120122/REG/301229987, 5 pages.

Kelly Greene, "Say Goodbye to the 4% Rule", The Wall Street Journal, Mar. 1, 2013, http://online.wsj.com/article/SB10001424127887324162304578 30 . . . , 5 pages.

Michael E. Kitces, "Resolving the Paradox—Is the Safe Withdrawal Rate Sometimes Too Safe?", May 2008, The Kitces Report, http://www.kitces.com, 13 pages.

"The Dogs of the Dow", from Wikipedia, http://en.wikipedia.org/w/index.php?title=The_Dogs_of_the_Dow&oldid=501616115, Jul. 10, 2012, 2 Pages.

Raymond Fazzi, "Variable Annuities Slump With Market", Financial Advisor Magazine, Mar. 2002 issue, 2 pages.

Siegel, Jeremy J. "Stocks for the Long Run: The Definitive Guide to Financial Market Returns and Long-term Investment Strategies," 2nd Edition, New York: McGraw-Hill, 1998.

International Search Report and Written Opinion mailed Oct. 22, 2013 in PCT Application No. PCT/US2013/047270.

Notification Concerning Transmittal of International Preliminary Report on Patentability, and International Preliminary Report on Patentability, mailed Jan. 8, 2015 in International Application No. PCT/US2013/047270.

\* cited by examiner

```php
<?php
/*
montedistnumscenarios is number of total tests
tlnumyears is client retirement number of years
myzees is array of Z variables
nst is number of sufficient tests
*/
?>
<?php
for($d=0;$d<$montedistnumscenarios;$d++) {
for($y=0;$y<=$tlnumyears;$y++) {
$dy = $d+$y;
$sumzee[$d] += $myzees[$dy];
}
}
?>
<?php
$maxnstthreshold = $tlnumyears*0.50;
$minnstthreshold = $tlnumyears*0.50*-1;
?>
<?php
for($d=0;$d<$montedistnumscenarios;$d++) {
if($sumzee[$d]>$maxnstthreshold) {
$maxnst = $d;
break;
}
}
?>
<?php
for($d=0;$d<$montedistnumscenarios;$d++) {
if($sumzee[$d]<$minnstthreshold) {
$minnst = $d;
break;
}
}
?>
<?php
$nst = max($minnst,$maxnst,400);
```

FIG. 6

| Total Return | Min | Max | Range |
|---|---|---|---|
| TRHist | 2.25 | 20.49 | 18.24 |
| TRMonte | 0.72 | 51.31 | 50.59 |
| TRTRUMonteDate1 | 1.55 | 13.98 | 12.42 |
| TRTRUMonteDate2 | 4.60 | 40.18 | 35.58 |
| TRTRUMontePar | 2.68 | 23.75 | 21.07 |

| Total Return | Min | Max | Range |
|---|---|---|---|
| MoneyGuidePro | 0.60 | 91.94 | 91.34 |
| EasyMoney | 0.12 | 541.43 | 541.31 |
| Emoney | 0.88 | 217.10 | 216.21 |

*FIG. 23*

Parameters

| | |
|---|---|
| Start Year | 2019 |
| Number Years | 31 |
| Starting Balance | 1135370 |
| Average ROR 0.1047 | 0.1047 |
| Standard Deviation 0.1615 | 0.1615 |
| RN 16.8 | 17 |
| Current TRURatio 1.11 | 1 |
| Number Monte Tests | 100 |
| Scale Factor | 1 |
| Withdrawal Adjustment | 1 |
| Estimated Tax Load | 0 |
| Fee Percent | 0 |

Calculate

FIG. 27

Parameters

| Summary Info Provided | |
|---|---|
| StartingBalance | 1135370 |
| Contact1Age | 60 |
| Contact2Age | |
| StartYear | 2019 |
| NumYears | 31 |
| NumAccounts | 7 |
| InflAvg | 0.0624 |
| ReturnAvg | 0.0741 |
| ExpectedReturn | 0.0741 |
| StandardDeviation | 0.133 |
| AssetMix | Custom |
| Inflation | 0.0624 |
| EstimatedTaxLoad | 0.00 |
| FeePercent | 0.00 |
| MaritalStatus | Married |

Fail Up Down Results

Hist

| | |
|---|---|
| Hist Fail Down | 0 |
| Hist Num Tests | 32 |
| Hist Fail Percent | 0.00 |
| Hist Min | 113,537 |
| Hist Avg | 11,110,882 |
| Hist Max | 21,323,223 |
| Range | 0 To 21 Mil |
| TR Min | 11 |
| TR Avg | 18 |
| TR Max | 33 |

TRUMonte

| | |
|---|---|
| TRUMonte Fail Down | 39 |
| TRUMonte Num Tests | 3000 |
| TRUMonte Fail Percent | 0.01 |
| TRUMonte Min | -2,593,660 |
| TRUMonte Avg | 11,621,356 |
| TRUMonte Max | 63,555,639 |
| Range | -3 To 64 Mil |
| TR Min | 4 |
| TR Avg | 19 |
| TR Max | 89 |

Monte

| | |
|---|---|
| Monte Fail Down | 360 |
| Monte Num Tests | 3000 |
| Monte Fail Percent | 0.12 |
| Monte Min | -4,761,539 |
| Monte Avg | 14,354,437 |
| Monte Max | 166,470,620 |
| Range | -5 To 166 Mil |
| TR Min | 1 |
| TR Avg | 21 |
| TR Max | 177 |

*FIG. 29*

Parameters

| Field | Value |
|---|---|
| Start Year | 2019 |
| Chart Num Years | 50 |
| Dist Num Years | 32 |
| Starting Balance | 1296562 |
| Average ROR | 0.1087 |
| Standard Deviation | 0.2019 |
| RN 10 | 10 |
| Current TRUratio | 1.0 |
| Number Monte Tests | 1400 |
| Scale Factor | 1 |
| Withdrawal Adjustment | 1.0 |
| Estimated Tax Load | 0.00 |
| Fee Percent | 0.000 |
| clientwidth | 570 |
| clientsystem w h | 570 x 775 |
| clientplatform | Win32 |
| clientbrowser | Mozilla/5.0 (Wind... |
| rsst 1371 | 1400 |

Calculate

Reset

FIG. 31

SYSTEMS AND METHODS FOR CONTROLLING PREDICTIVE MODELING PROCESSES ON A MOBILE DEVICE

CROSS-REFERENCE TO RELATED APPLICATIONS

This application claims the benefit of U.S. Provisional Application No. 62/935,775, filed Nov. 15, 2019, which is herein incorporated by reference in its entirety.

TECHNICAL FIELD

The present embodiments relate generally to mobile devices, for example, cellular telephones or mobile telephones, and to client-server communications, in some cases over a telecommunications network, and, more particularly, to systems and methods for controlling predictive modeling processes on a mobile device.

BACKGROUND

Predictive modeling is typically used to evaluate the probability of different outcomes based on a set of variables, to assist in predicting the behavior of complex systems. Those complex systems may be in any field that deals with problems involving multiple uncertain variables, including engineering, science, supply chain, elections, and finance. The predictive modeling, which also may be considered multiple probability simulation, may use random sampling techniques and simulations to approximate solutions to complex mathematical or physical problems, especially in terms of a range of values each of which has a calculated probability of being the solution.

As the amount of data and the number of uncertain variables increase, the number of calculations necessary to produce a full range of outcomes can quickly overwhelm available computational resources, causing computer hardware and software errors. Indeed, complex predictive models—such as weather forecasting, oil exploration, aircraft modeling, and market-based investment projections—often demand computing capacities beyond those of the typical consumer mobile device or desktop personal computer.

Thus, there remains a need for systems and methods that address the shortcomings discussed above.

SUMMARY

Embodiments provide systems, methods, and devices for managing predictive modeling processes between a server and a client device, especially for a wireless mobile communications client device.

An embodiment may provide a method for controlling predictive modeling processes on a mobile device. The method may include receiving modeling data associated with a predictive model, receiving computation resources data of the mobile device, determining one or more predictive model processing parameters of the predictive model based on the modeling data and the computation resources data, formulating processing instructions based on the one or more predictive model processing parameters, and sending the modeling data and the processing instructions to the mobile device for execution of the predictive model.

In an aspect, the one or more predictive model processing parameters may comprise a sufficient number of tests.

In another aspect, the method may further comprise determining resources of the mobile device allocated to execute the predictive model, causing the mobile device to display the determined resources on the mobile device for confirmation to proceed with processing of the predictive model, and when the confirmation is received, proceeding with the predictive model.

In another aspect, the method may further comprise, when the confirmation is withheld, modifying the one or more predictive model processing parameters to change the resources of the mobile device allocated to execute the predictive model.

In another aspect, the one or more predictive model processing parameters may comprise a type of predictive modeling simulation. Formulating processing instructions may comprise formulating processing instructions to execute one or more types of predictive modeling simulations within capabilities of the mobile device as defined in the computation resources data of the mobile device.

In another aspect, the processing instructions may comprise executing a single predictive modeling simulation using a modified Monte Carlo simulation biased with trend reversion and current price deflection.

In another aspect, the one or more predictive model processing parameters may comprise a location of processing as between a server side and a client side, and the mobile device may comprise the client side.

In another aspect, the one or more predictive model processing parameters may comprise rendering of graphical and/or tabular results.

Another embodiment may provide a method for controlling predictive modeling processes on a mobile device. The method may include receiving, at a server computing device, modeling data associated with a predictive model, determining, at the server computing device, one or more parameters associated with the predictive model, determining, at the server computing device, computing resources needed to execute the predictive model based on the modeling data and the one or more parameters, determining whether resources of the mobile device meet the needed computing resources, modifying, when the resources of the mobile device do not meet the needed computing resources, the one or more parameters to reduce the needed computing resources to accommodate the resources of the mobile device, and sending from the server computing device to the mobile device the modeling data and instructions for executing the predictive model based on the modified one or more parameters.

In an aspect, the one or more parameters may comprise a sufficient number of tests for the predictive model, and modifying the one or more parameters may comprise reducing the sufficient number of tests.

In another aspect, the one or more parameters may comprise a sufficient number of tests for the predictive model, and determining the sufficient number of tests for the predictive model may comprise pre-scanning random numbers generated for the predictive model, designating an upper threshold and a lower threshold, and identifying a first number of tests at which an average of the random numbers for a given test first becomes equal to or greater than the upper threshold and a second number of tests at which an average of the random numbers for a given test first becomes equal to or less than the lower threshold. The method may then further comprise designating the sufficient number of tests to be either: (a) the greater of the first number of tests and the second number of tests; or (b) the greater of the first number of tests, the second number of tests, and a designated minimum sufficient number of tests.

In another aspect, the one or more parameters may comprise a type of predictive modeling simulation.

In another aspect, the modified one or more parameters may comprise a modified Monte Carlo simulation.

In another aspect, the modified Monte Carlo simulation may comprise a Monte Carlo analysis biased with trend reversion and current price deflection. The biased Monte Carlo analysis may provide an adjustable mean recovery bias. The biased Monte Carlo analysis may also provide an adjustable deflection restraint.

In another aspect, the one or more parameters may comprise an allocation of execution of the predictive model between the server computing device and the mobile device.

In another aspect, the modified one or more parameters may comprise an allocation of more processing of the execution of the predictive model to the server computing device and less processing of the execution of the predictive model to the mobile device.

In another aspect, the one or more parameters may comprise rendering of graphical and/or tabular results.

Another embodiment may provide a system for controlling predictive modeling processes on a mobile computing device. The system may include a server computing device in communication with a mobile computing device over a network. The server computing device may be configured to receive modeling data associated with a predictive model, receive computation resources data of the mobile computing device, determine one or more predictive model processing parameters of the predictive model based on the modeling data and the computation resources data, formulate processing instructions based on the one or more predictive model processing parameters, and send the modeling data and the processing instructions to the mobile computing device for execution of the predictive model.

In an aspect, the one or more predictive model processing parameters may comprise a sufficient number of tests.

In another aspect, the one or more predictive model processing parameters may comprise a type of predictive modeling simulation, and formulating processing instructions may comprise formulating processing instructions to execute a single predictive modeling simulation using a modified Monte Carlo simulation biased with trend reversion and current price deflection.

Embodiments (referred to herein as "TRU Monte") relate generally to predictive modeling related to investment account management and, more particularly, to systems and methods for projecting returns on investment accounts using trend reversion and current price deflection bias (which may also be referred to herein as value-gap adjustment).

Successful financial planning typically involves an assessment of current income and expense amounts along with expected future income and expense amounts, so that cash flow may be determined each year before and after retirement. The goal is to sustain funds in the retirement account through the lifetime of the retiree. Determining current job-based income and current and future expenses may be relatively straightforward. However, predicting future income from investments can be challenging due to market volatility.

Embodiments provide a system and method for more precisely, quickly, and efficiently projecting returns on investment accounts using trend reversion and current price deflection bias.

In one aspect, an embodiment provides at least two unique techniques to projecting investment account returns. Akin to a "spring force," the first technique pulls the mean trend around which the random variance fluctuates, from the deflected starting point on the starting date, back towards the established historical long-term mean level of the underlying asset or portfolio (over some period of time), and along a glide slope defined in number of years, where the projected returns will resume a log trend from there. As the glide path approaches the long-established mean, the spring force weakens as it approaches the historic level.

The second technique is the ability to adjust the range of pull that limits the deflection that keeps the individual scenarios from cascading to average performance levels (high or low) that are way beyond what has proven to be historically probable. As an analogy, someday a human being may bench press 6,000 pounds; however, that is not something to be concerned with now, just like there is no need to assume that stocks will earn 20% a year for twenty consecutive years (which traditional Monte Carlo analyses consider).

Other systems, methods, features, and advantages of the embodiments will be, or will become, apparent to one of ordinary skill in the art upon examination of the following figure and detailed description. It is intended that all such additional systems, methods, features, and advantages be included within this description and this summary, be within the scope of the embodiments, and be protected by the claims.

BRIEF DESCRIPTION OF THE DRAWINGS

The present embodiments can be better understood with reference to the following drawings and description. The components in the figures are not necessarily to scale, emphasis instead being placed upon illustrating the principles of the present embodiments. Moreover, in the figures, like reference numerals designate corresponding parts throughout the different views.

FIG. 6 is a listing of exemplary software code for determining a sufficient number of tests, according to an embodiment;

FIG. 23 is a table illustrating an exemplary comparison of nominal total returns results between the present embodiments and other commercially available software products;

FIGS. 27-30 are images of graphical user interfaces illustrating exemplary software and web applications implementing TRU Monte systems and predictive modeling methods for projecting returns, according to embodiments; and FIG. 31 is an image of a graphical user interface illustrating exemplary parameters for predictive modeling processing according to an embodiment.

DESCRIPTION OF EMBODIMENTS

Embodiments provide mobile computing devices, related systems, and methods for controlling predictive modeling processes on a mobile device. In particular, embodiments may conduct a pre-modeling analysis to determine how the predictive modeling process may be most efficiently executed within a client-server architecture that provides the modeling results on a client device, such as a mobile computing device (e.g., smartphone or tablet computer). The predictive modeling processes often involve simulation systems that process large data sets and implement complex, repetitive calculations, which may quickly stress the available computing capacity of a client device. Examples of predictive modeling processes include time-series regression models (e.g., to predict airline traffic volume) or linear regression models (e.g., to predict fuel efficiency). In embodiments, using simulation techniques, a predictive modeling process may address physics-related problems, weather forecasting, engineering studies, election results projections, and investment forecasting.

In managing computing demands of a client device, embodiments may provide mobile computing devices, related systems, and methods that are tailored for the computing and display abilities of an individual client device. In particular, embodiments may implement modified simulation techniques to promote the most efficient processing on a client device. In embodiments, a modified simulation technique may be a modified Monte Carlo technique. Embodiments of a modified Monte Carlo technique may predict results using trend reversion and current price deflection bias. For example, embodiments involving investment forecasting may use a modified Monte Carlo technique that projects returns on investment accounts using trend reversion and current price deflection bias (also referred to as value-gap adjustment). In embodiments, methods and systems may use the modified Monte Carlo technique with trend reversion utilization and current price deflection bias, also referred to herein as TRU Monte.

Figure 1:
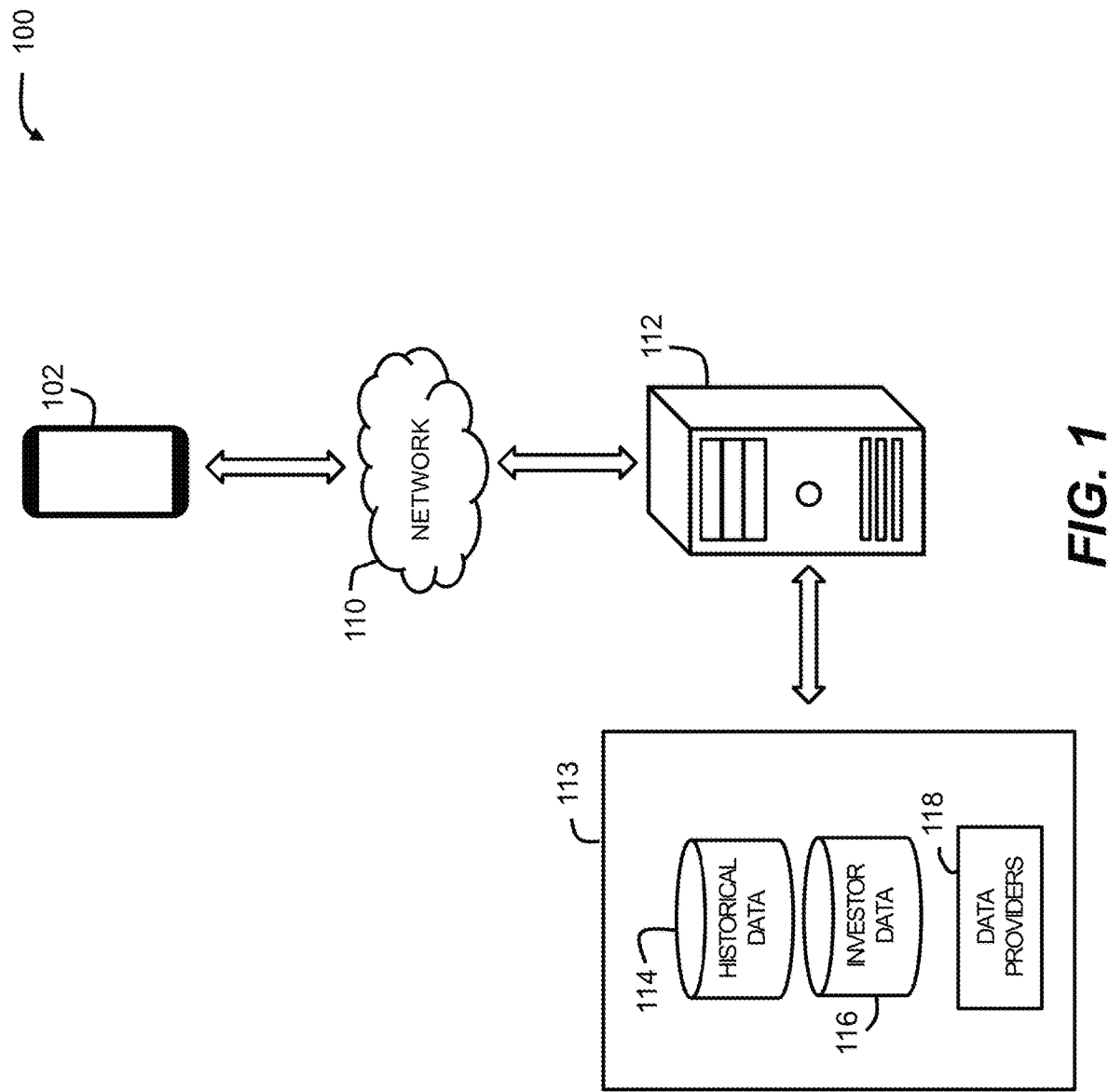
FIG. 1 is a schematic diagram of an embodiment of a system that includes several hardware components in electronic communication with each other.

Most broadly, as shown in FIG. 1, a system 100 for controlling predictive modeling processes may include a mobile computing device 102, and a server computing device 112 that is in communication with one or more information sources 113. In embodiments, system 100 may be used for controlling predictive modeling processes related to investment accounts, and for improved projection of investment returns.

Generally, a mobile computing device 102 may include any computing device that is configured to be carried and transported by a person—and communicates wirelessly with one or more networks. In particular, a mobile computing device 102 may comprise a smartphone such as an iPhone™ or a smartphone running the Android™ operating system. Mobile computing device 102 may broadly encompass any mobile device that includes a processor, machine readable media including electronic instructions which may be executed by the processor, and wireless networking hardware allowing the mobile device to communicate with other computing devices over a wireless network. In alternative embodiments, mobile computing device 102 may be a mobile personal computer (e.g., laptop), a tablet computer, or even a desktop computer.

Server computing device 112 may generally be any computing device that includes a processor and machine-readable media that includes instructions that may be executed by the processor. Broadly, the processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smartphones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present embodiments may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Next, system 100 may include a network 110 that may allow mobile computing device 102 to be in electronic communication with server computing device 112. Generally, the embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (IPsec).

Server computing device 112 may be configured to receive or access data from various information sources 113. For example, as shown, server computing device 112 may communicate with information sources such as historical data database 114, investor data database 116, and data providers 118. Server computing device 112 may communicate with and/or access information sources 113 either remotely over a network or locally.

Historical data database 114 may be a database that includes data that is descriptive of the historical returns of various investment asset classes. Data included in historical data database 114 may include fields such as fundname, funddate, infotype, fundamount, and id. The fundname may be the type of asset, e.g., stocks or bonds. The funddate may be the historical date, e.g., 1927-01-01. The infotype may be the type of information, e.g., rate of return or TRURatio. And, the fundamount may store the relevant amount.

Investor data database 116 may be a database that includes data descriptive of an investor (also referred to herein as a customer) and/or an investor's account. Such data may include, for example, basic investor information, timeline information, income and expenses information, retirement account information, asset mix information, and cash flow information. Basic investor information may include, for example, name, address, and telephone number. Timeline information may include, for example, date of birth, current age, expected retirement age, and expected mortality age. Income and expense information may include, for example, expected Social Security income, mortgage payments, fixed expenses, and discretionary expenses. Retirement account information may include, for example, current balances, expected tax loads, and expected returns. Asset mix information may include, for example, the particular mix of investment assets of each account, which may be used to create expected future returns. Cash flow information may include, for example, a cash flow determined by the difference between future income and future expenses that will need to be withdrawn from retirement savings in the future.

Data providers 118 may provide any data needed to implement a predictive modeling process according to the present embodiments. Data providers 118 may populate databases among the information sources 113, such as databases 114, 116. Alternatively, data providers 118 may communicate data directly to the server computing device 112. Although not shown in FIG. 1, data providers 118 may also communicate with mobile computing device 102 through network 110, to send data to mobile computing device 102.

The system 100 of FIG. 1 may be used to implement a predictive modeling process, which may involve projecting returns on investment accounts using trend reversion and current price deflection bias. Namely, server computing device 112 may include machine-readable media including instructions which, when executed by the processor in server computing device 112, cause the processor to execute a series of actions. Furthermore, mobile computing device 102 may also include machine-readable media including instructions which, when executed by the processor in mobile computing device 102, cause the processor to execute a series of actions. Embodiments of these actions taken by mobile computing device 102 are shown in FIG. 2.

Figure 2:
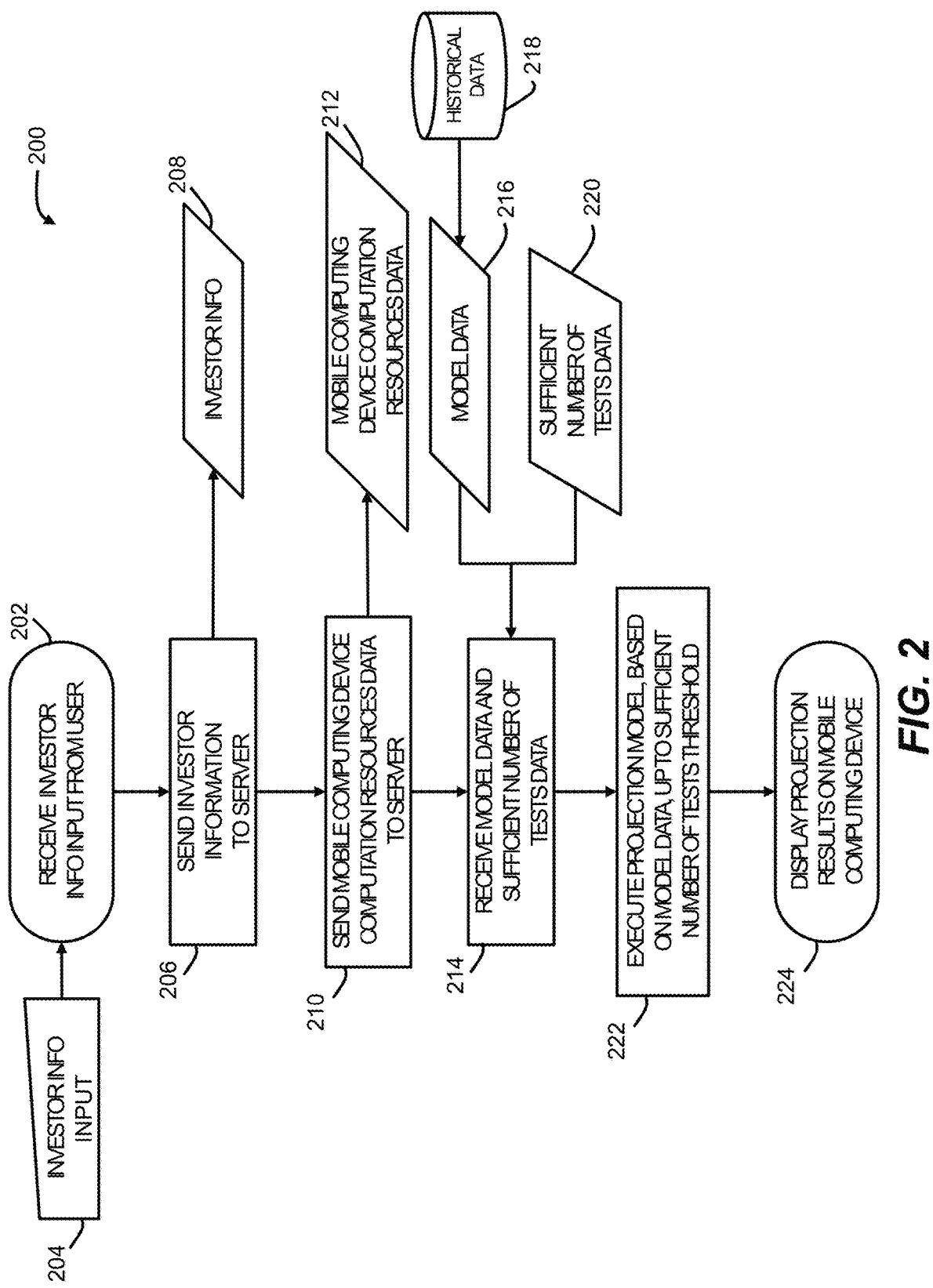
FIG. 2 is a flowchart illustrating an embodiment of a process in accordance with this disclosure.

FIG. 2 is a flowchart that illustrates an embodiment of how a mobile computing device 102 may execute a predictive modeling process, with this example involving projecting returns on investment accounts using trend reversion and current price deflection bias. Method 200 may begin in step 202 when the mobile computing device 102 receives investor information input 204. Investor information input 204 may include the current balances, taxability, and investment asset allocation choices for each retirement account associated with the investor, as well as a desired annual withdrawal amount. Investor information input 204 may be inputted into the mobile computing device 102 by a user manually, such as by typing—or may be uploaded to the mobile computing device 102 from another data provider 118, such as a brokerage website or a third-party investment data aggregation tool such as EMoney™. In embodiments, a user may be the investor and/or the investor's financial advisor.

In alternative embodiments, some or all of the investor information may already be received by, or accessible to, the server, for example, from information sources 113 shown in FIG. 1. In such circumstances, investor information input 204 may be basic information associated with the investor, for example, to identify the investor and match the investor to data already received by, or accessible to, the server.

Next, in step 206, mobile computing device 102 may send investor information 208 to a server, such as server computing device 112.

Mobile computing device 102 may also send, to the server, data 212 regarding the mobile computing device's computation resources in step 210. This data 212 may be descriptive of the mobile computing device's processor, memory, operating system, and other hardware capabilities that may allow it to perform a certain number of calculations at a certain speed while using a certain amount of resources, e.g., memory, processors, and/or battery life. This step may advantageously allow the server to determine whether the mobile computing device's resources are sufficient to execute any given projection model for a certain quantity of tests. For example, because the calculations in the projection model may be very intensive, some mobile computing devices may not be able to perform them in large quantities without draining the battery, exceeding memory or processing capacity, and/or overheating. Accordingly, as part of method 200, a mobile computing device 102 may send, in step 210, data 212 descriptive of its available computation resources. The server may then incorporate this limit when generating the projection model.

Subsequently, in step 214, a mobile computing device may receive the model data 216 and the sufficient number of tests data 220. Model data 216 may include the data and relationships necessary to execute the predictive modeling. For example, model data 216 may include the data and relationships necessary to calculate a range of investment projection results based on the investor information 208 and the mobile computing device computation resources data 212. Model data 216 may also be based on historical data regarding investment returns, available from a historical data database 218.

As a result, mobile computing device 102 may execute the projection model in step 222. Execution of the projection model in step 222 may be based on model data 216 received in step 214 and also sufficient number of tests data 220 also received in step 214.

Finally, in step 224, mobile computing device may display results of the projection model thereon. The results displayed on the mobile computing device may be, for example, tabular, showing various information in table format, or graphical by showing various information in a variety of color-coded graphs—as shown in other figures discussed herein.

Figure 3:
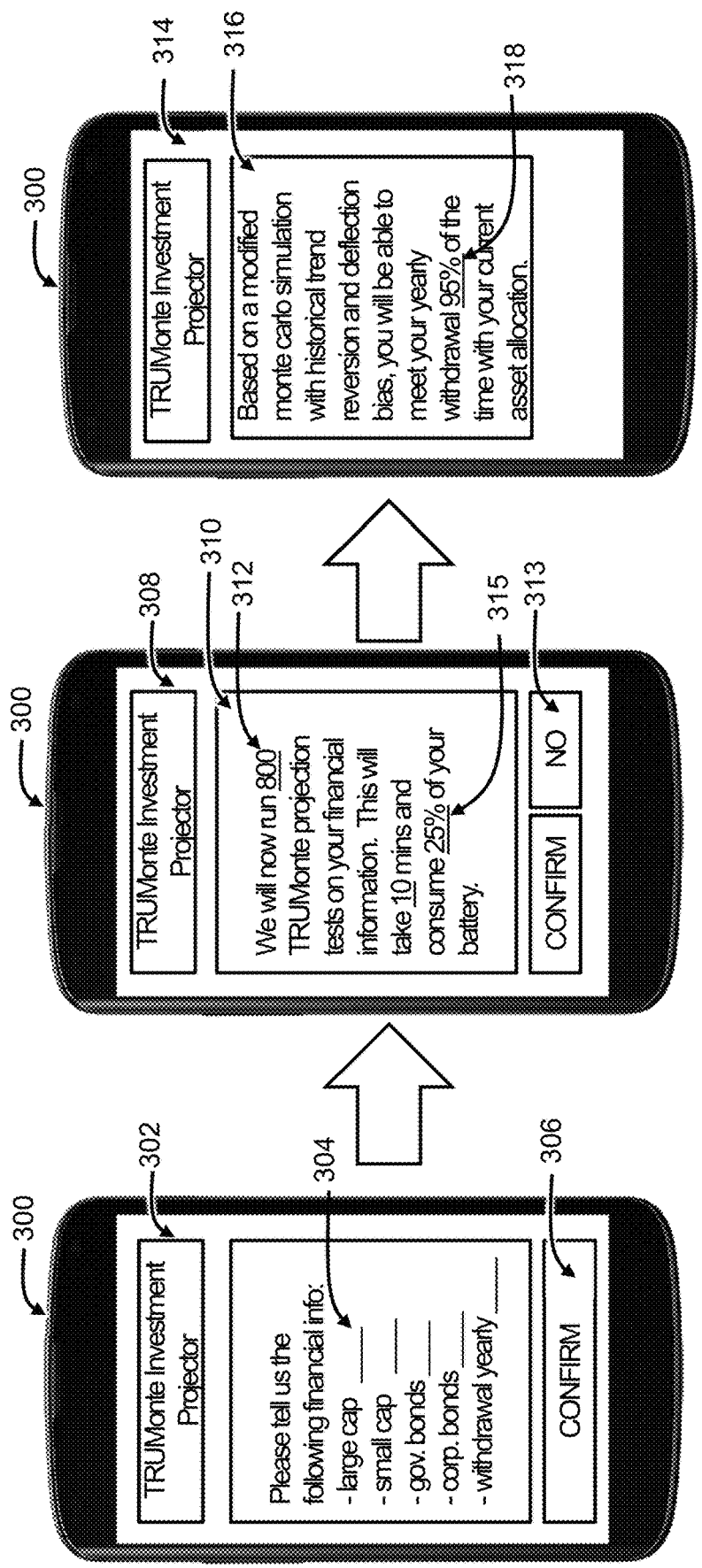
FIG. 3 is a schematic diagram illustrating an embodiment of a mobile computing device in accordance with this disclosure.

FIG. 3 shows a mobile computing device 300 as it may perform method 200, according to an embodiment. Namely, mobile computing device 300 may include first screen 302 that includes field 304 for inputting investor information input 204. Screen 302 may also include confirmation prompt 306 to submit investor information input 204 once it is fully typed into field 304. Next, mobile computing device 300 may receive model data and sufficient number of tests data per step 214 and display related information at field 310 of screen 308. Namely, field 310 may display sufficient number of tests data 312 and related mobile device computing resources information 315. Screen 308 may also include confirmation prompt 313, which may require the user to confirm before the projection model is run or to answer "no" so as to be afforded an option (not shown) to change parameters of the projection model.

Finally, mobile computing device 300 may display a screen 314 that includes results field 316 that (in this embodiment) may display textual information 318 regarding the projection model results. However, in other embodiments, screen 314 may include graphical representations of the projection model results—such as the graphs shown in other figures discussed herein.

As demonstrated in FIGS. 2 and 3, embodiments may control a predictive modeling process on a mobile device, tailoring the process to accommodate the capabilities of the mobile device. In embodiments, the process may be adapted for a particular client device by limiting the amount of model data and/or the sufficient number of tests. As shown in FIG. 3, embodiments may also allow a user of a client device to consider the resources (e.g., time, memory, and battery life) required to execute a predictive modeling process, and either authorize the execution or refuse the execution. If the user refuses the execution, embodiments may suspend or cancel the predictive modeling process, and may modify the process to use less resources. Embodiments may then present the modified process to the user for authorization or refusal of the modified process.

Alternative embodiments may include provisions for automatically accommodating the capabilities of a client device. For example, referring to FIG. 3, rather than requesting from a user confirmation to proceed with a predictive model based on proposed required resources, embodiments may evaluate the resources of the client device and automatically determine an appropriate amount of resources that will not overburden the client device. As an example, in the context of repetitive simulations of predictive modeling, embodiments may focus on determining a "sweet spot" for a sufficient number of tests, which may be a number that produces meaningful, accurate results, avoids redundant processing (e.g., extra tests) that do not materially improve the results, and keeps the processing demands within the capabilities of the client device.

Figure 4:
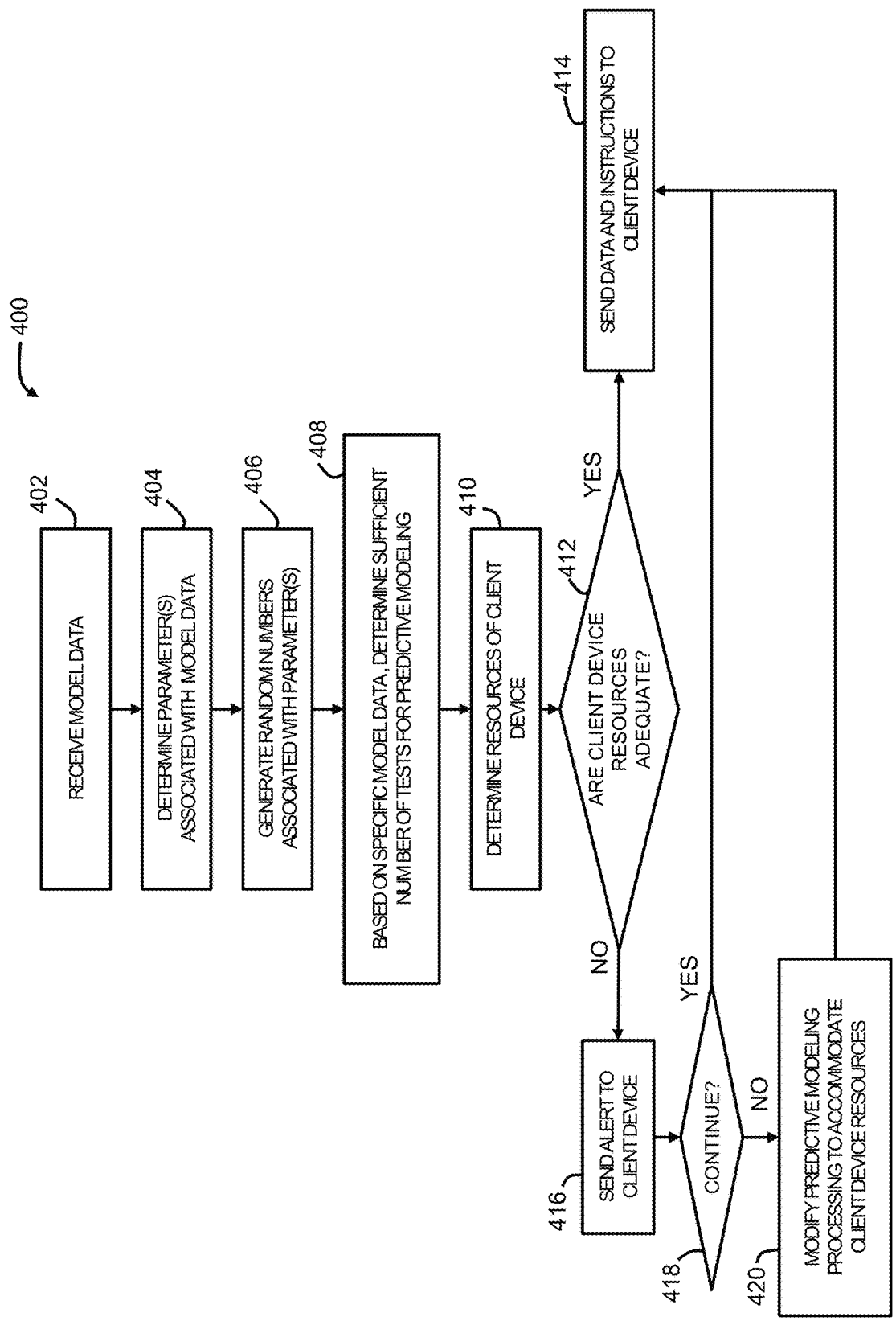
FIG. 4 is a flowchart illustrating an embodiment of a method for controlling predictive modeling processes on a client device.

FIG. 4 is a flowchart that illustrates a method 400 for controlling a predictive modeling process on a client device (e.g., mobile device), in the context of a client-server architecture such as shown in FIG. 1, and from the perspective of the server. In embodiments, method 400 may allow for both manual and automatic setting of the parameters for a predictive model, such as the setting of a number of tests sufficient for achieving an accurate and meaningful projection. In embodiments, a client device may be capable of executing a model with the sufficient number of tests. In some embodiments, however, a client device may not be capable, in which case embodiments may modify the predictive modeling processing to accommodate the limitations of the client device.

As shown in FIG. 4, method 400 may begin in step 402 by receiving model data. For example, server computing device 112 may receive or access model data from information sources 113 as shown in FIG. 1, or may receive input from a user as shown in FIGS. 2 and 3. The model data may include data necessary to execute the predictive modeling. For example, with investment account predictive modeling, the model data may include historical market data, basic investor information, timeline information, income and expenses information, retirement account information, asset mix information, and cash flow information.

Method 400 may then continue in step 404 by determining one or more parameters associated with the model data. Server computing device 112 may perform this step. In embodiments, these parameters may impact the range of results of the predictive modeling. In implementations involving the predictions of investment returns, a parameter may be rate of return, or ROR.

With the one or more parameters determined, method 400 may continue in step 406 by generating random numbers associated with the one or more parameters. In embodiments, a random number generator may be used, such as the functions available in software applications like PHP, Microsoft Excel™, and Python. In embodiments, server computing device 112 may perform this step.

In step 408, method 400 may continue by determining a sufficient number of tests for the predictive modeling. That determination may be based on the specific model data, and may be performed by the server computing device 112. The determination may be based on factors such as the amount of data and the redundancy of the generated random numbers. In implementations involving investment return modeling, the factors may include the number of years being forecasted and the volatility of the underlying assets (e.g., bonds versus stocks).

As a general matter, a sufficient number of tests provides a user with an estimation of what might possibly occur in the future. The results preferably show values (e.g., rates of return) at the upper end of what might happen, and at the lower end of what might happen. The results also preferably show a distribution of values (e.g., rates of return) that are normally distributed as in a frequency chart that is a bell curve. By determining a sufficient number of tests, a predictive modeling process may minimize the number of tests that are run on smaller mobile devices, thereby reducing the amount of processing power that must be utilized.

In embodiments, determining a sufficient number of tests may be accomplished by analyzing, or pre-scanning, the random numbers generated in step 406. In this pre-scan, method 400 may designate an upper threshold and a lower threshold, and then identify a first number of tests at which the average of the random numbers for a given test first becomes equal to or greater than the upper threshold, and a second number of tests at which the average of the random numbers for a given test first becomes equal to or less than the lower threshold. The sufficient number of tests may then be considered to be the greater of the first number of tests and the second number of tests.

As an example, in the context of modeling future rates of return for an investment, embodiments may determine a sufficient number of tests by examining the generated random numbers for each test d and calculating SumZee as:

$$(y=1, y<=numyears, y++)\{dy=d+y; SumZee[d]+=Zee[dy];\}$$

where y is the year, numyears is the time period (number of years), d is the test, and Zee is the random number. SumZee is the sum of the random numbers for a given test. SumZee divided by the number of years is the average of the random numbers for a given test (e.g., Average Zee=SumZee/number of years).

For example, according to the calculation, if numyears is a retirement period (or time horizon) of 30 years, for each test add the Zee's for the next 30 years.

Figure 5:
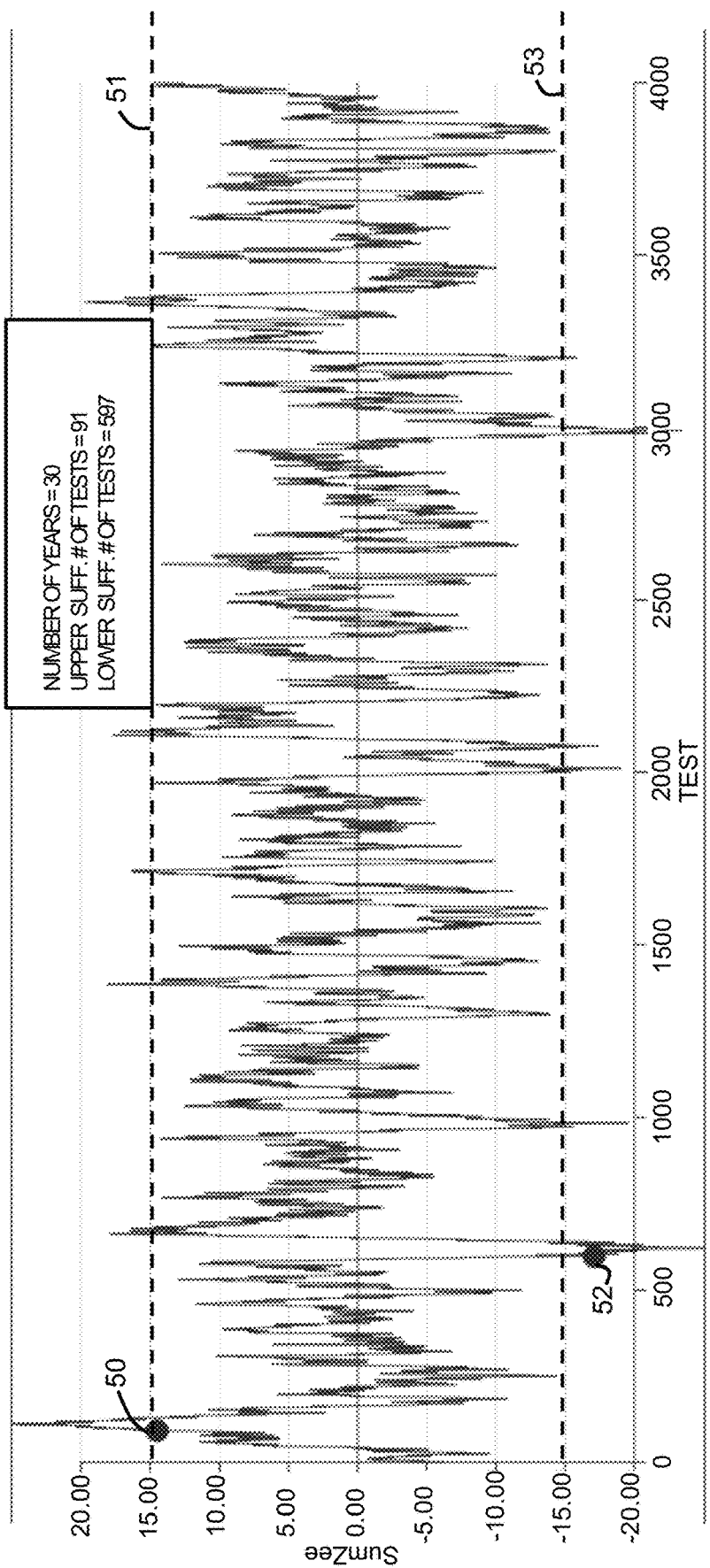
FIG. 5 is a graph illustrating calculated sums of random numbers (SumZee), according to an embodiment.

As an example, FIG. 5 illustrates a graph of calculated SumZee values, which are centered around zero. The highest values are above upper threshold 51 and the lowest values are below lower threshold 53. In embodiments, the upper threshold may be determined as 0.5×number of years, while the lower threshold may be determined as −0.5×number of years. The number of years may be specific to an investor's situation, i.e., how long the investor's retirement period is anticipated to be. In this example, the number of years is 30, so that the upper threshold is 15 and the lower threshold is −15. The thresholds may be established based on historical data.

With the calculated SumZee values graphed and the thresholds established, it may then be determined at what number of tests the SumZee first reached (became equal to or greater than) the upper threshold 51 (upper threshold sufficient number of tests), and at what number of tests the SumZee first reached (became equal to or less than) the lower threshold 53 (lower threshold sufficient number of tests). As shown, in this example, the upper threshold sufficient number of tests is 91 (see reference numeral 50, which represents the number of tests that first equaled or exceeded the upper threshold 51) and the lower threshold sufficient number of tests is 597 (see reference numeral 52, which represents the number of tests that first equaled or went below the lower threshold 53).

In embodiments, the sufficient number of tests would then be determined as the greater of the upper threshold sufficient number of tests and the lower threshold sufficient number of tests, which in this example would be 597. In other embodiments, a minimum sufficient number of tests may also be imposed based on historical analyses of similar data and on the number of tests historically needed to create normally distributed frequency of results values. For example, based on the number of tests historically needed to create normally distributed frequency of rates of return for investments, a minimum sufficient number of tests may be set within a range of 400-600 tests, such as 500 tests. Thus, in embodiments, the sufficient number of tests may be determined as the larger of the upper threshold sufficient number of tests, the lower threshold sufficient number of tests, and the minimum sufficient number of tests.

Although FIG. 5 illustrates a determination of a sufficient number of tests for a particular number of years (i.e., 30 years) using SumZee, embodiments may determine a sufficient number of tests based on the average of the random numbers for a given test, or the Average Zee. This approach may generalize the determination for any number of years (e.g., 10-, 20-, or 30-year periods), by basing the upper and lower thresholds on the factors used in setting the upper and lower thresholds, such as the 0.5 and −0.5 discussed above in reference to FIG. 5. Those threshold factors may be established based on historical data. Thus, corresponding to the example of FIG. 5, for determining a sufficient number of tests in the context of investment forecasting, embodiments may determine at what point in the number of tests the average of the random numbers first became equal to or greater than 0.5 and at what point in the number of tests the average of the random numbers first became equal to or less than −0.5. The average of the random numbers for a given test may be calculated as the SumZee for the given test divided by the number of years. As demonstrated in FIG. 5, once the sufficient number of tests is reached, any additional tests (to the right of 52) would lead to redundant results of a predictive model, such as the investment account predictive model using modified Monte Carlo simulations, described in more detail below. Those additional tests would simply duplicate the same results or slightly expand the results beyond what is possible.

To further illustrate the above example of the determination of sufficient number of tests, FIG. 6 lists an embodiment of exemplary software code for determining sufficient number of tests, with comments at the top explaining the variables. In embodiments, software may automatically determine a sufficient number of tests.

In embodiments, determinations of sufficient number of tests may evaluate SumZee and/or Average Zee. Choosing which to evaluate may depend on the functions available in a software application. For example, with PHP, which does not have a sum( ) or average( ) function, embodiments may evaluate SumZee, which may require less processing time. As an example, with PHP, if there are 10,000 variable numbers Zee, obtaining the SumZee may involve looping through all of those 10,000 numbers one time. On the other hand, obtaining Average Zee may involve looping twice through all of those 10,000 numbers, a first time to obtain the SumZee and a second time to obtain the Average Zee, where Average Zee=SumZee/number of years. That second loop may significantly increase processing time. Other embodiments may evaluate Average Zee using software applications supporting sum( ) or average( ) functions, such as MS Excel™.

Other techniques for determining a sufficient number of tests are possible, including mathematical or graphical techniques. In alternative embodiments, instead of analyzing the generated random numbers, the simulations of the predictive modeling may be run using the generated random numbers, and the results may be analyzed for redundancy. For example, simulation results may be plotted on a graph and the sufficient number of tests may be determined when the plotted lines reach a predetermined density within a designated range of results.

Returning to FIG. 4, after determining the sufficient number of tests, method 400 may continue in step 410 by determining the resources of a client device. The resources may include, for example, the amount of memory, the processing speed, the display resolution, the display size, the operating system or platform, the web browser type, the power source(s), the amount of power available (e.g., battery remaining), the network communication speed, and current network availability (e.g., WiFi, wireless mobile communication network, near-field communication (NFC), and Bluetooth). In embodiments, referring to FIG. 1, a server computing device 112 may interrogate a mobile device 102 to determine the resources of the mobile device 102. This interrogation may involve queries requesting resource data, which may be facilitated through a mobile app allowing the sharing of such data. The interrogation may involve providing the client device with an assessment calculation and determining available resources from the duration required for the client device to complete the assessment calculation.

In embodiments, the interrogation of the client device may include analysis of software running on the client device. For example, the nature of the client device may be determined by javascript via the navigator object. Likewise, the client device's width and height may be determined by javascript. In embodiments, the processing capabilities of the client device may be approximated based on the screen size and operating system of the device. Using this approach, embodiments may roughly categorize client devices as a small, medium, or large.

In embodiments, the categories of small, medium, and large may be established by pixel amount, and possibly also operating system. For example, a small device may have a screen width of less than 600 pixels, a large device may have a screen width of greater than 1200 pixels, and a medium device may have a screen width within a range of 600 to 1200 pixels. Further categories are possible, for example, to capture larger phones and larger tablets. In determining the client device resources with respect to screen size, embodiments may use a Javascript/JQuery such as:

```
var screenwidth = window.innerWidth;
var nst = parseInt($("#nst").val( ));
if(screenwidth>1200) {
$("#chartnummontescenarios").val(4000);
}
else if(screenwidth>600) {
$("#chartnummontescenarios").val(2000);
}
else {
$("#chartnummontescenarios").val(nst);
}
```

After determining the client device resources in step 410, method 400 may continue in step 412 by determining whether the client device resources are adequate for performing the predictive modeling process with the sufficient number of tests determined in step 408.

If in step 412 it is determined that the client device resources are adequate, then method 400 may continue in step 414 by sending to the client device, data and instructions for performing the predictive modeling process. Embodiments of execution of such processes are described in more detail below.

If, however, in step 412, it is determined that the client device resources are inadequate, then method 400 may continue in step 416 by sending an alert to the client device regarding the suboptimal resources. The alert may be a screen such as screen 308 of FIG. 3, providing information on resources (e.g., time and battery power) to perform the predictive modeling and requesting approval or refusal to continue with the modeling. If approval is received, method 400 may continue as represented by the "YES" in step 418, proceeding to step 414 and sending data and instructions to the client device, despite the suboptimal resources.

In another embodiment, an alert may be sent to the client device without providing an opportunity to continue with the predictive modeling, in other words, skipping step 418.

In another embodiment, no alert may be sent, and instead method 400 may proceed from step 412 directly to step 420.

In step 420, method 400 may continue by modifying the predictive modeling process to accommodate the client device resources. Such modifications may involve, for example, adjusting the number of tests, adjusting the amount of data processed, adjusting the display of results, modifying the simulation technique, and/or modifying the processing duties and/or communications between the server computing device and the client device. As an example, after pre-scanning the random numbers and determining the sufficient number of tests based on the point at which testing becomes redundant (i.e., when additional tests would simply duplicate values that already exist), if it is determined that a particular device (e.g., small device) lacks the resources to adequately perform the predictive modeling with the sufficient number of tests, the number of tests may be reduced to accommodate the device's resources. On the other hand, if it is determined that a particular device (e.g., large device) has extra resource capacity, the number of tests may be increased, e.g., if requested to do so by a user, even if the additional tests may provide no greater insight into the projections.

After making modifications in step 420, method 400 may then continue in step 414 by sending to the client device, data and instructions necessary to perform the predictive modeling, based on the modifications of step 420.

In adapting the predictive modeling processing to a particular client device (e.g., in step 420 of FIG. 4), embodiments may modify the processing to ensure proper functioning of the client device and a pleasing user experience, avoiding blank screens and frustratingly slow progress bars. In embodiments, modifications may involve modified simulation techniques, adapted client/server processing, and/or device responsive rendering, described in more detail below.

Modified Simulation Techniques

As described above, embodiments may include provisions for executing predictive modeling using modified simulation techniques that minimize computing capacity demands. In particular, embodiments may avoid burdensome traditional Monte Carlo analyses, and instead use modified Monte Carlo techniques (also referred to as TRU Monte) that may provide more accurate results, more quickly, in fewer processing steps, and using less computer processing resources. The modified simulation techniques may also provide more accurate and meaningful results using a smaller number of tests, based on determinations of a sufficient number of tests, as described above, and thereby also saving computer resources. To further minimize computing requirements, embodiments may also omit linear projections and historical projections from a predictive modeling process, in favor of the modified Monte Carlo techniques. Embodiments may also limit the display of tabular and graphical results of one or more of linear projections, historical projections, or traditional Monte Carlo techniques, in favor of displaying results of a modified Monte Carlo analysis.

The following describes those modified simulation techniques in more detail, and the surprising benefits they may provide over the traditional projections and Monte Carlo simulations. In support of that description, the list below provides glossary and mathematical definitions for terms, variables, and mathematics described herein, according to embodiments:

1. TMC—Traditional Monte Carlo. The conventional method of generating future possible returns that are applied to a retiree's account balance.

2. TMC ROR=drift+shock, where drift=Average Rate of Return, and shock=Standard Deviation times Z. Z is a random number generated by software or programming.

3. Clyr=client year. Clyr 0 is for starting balance. For a 30-year retirement, clyr would range from 0 to 30.

4. Pyr=prior year.

5. Asset Avg ROR=average annual rate of return for a given asset.

6. Asset Standard Deviation=standard deviation of annual rate of return for given asset.

7. Slope=slope of best fit line calculated with Log Est function in excel or iterative program.

8. Y-Intercept=Y-Intercept of best fit line calculated with Log Est function in excel or iterative program.

9. Slope Max=name of program that was built to iteratively test different slope and Y-Intercepts to find combination that would provide optimal best fit line. The optimum best fit line would have the highest correlation to historical 20-year rates of return.

10. TRU Monte Y-Intercept=Y-Intercept of best fit line used in TRU Monte. Y-Intercept=1/TRURatio. This will bias the results based on the starting TRURatio. If TRURatio is over 1, the market is overpriced, and the returns will be lower than average.

11. BF—Best Fit line—replicates the Internal Value of an Asset and is calculated by Y-Intercept×Slope $\hat{\ }$n 12. Z—random variable between −3 and +3

13. TMC TR—Traditional Monte Carlo Total Return. TMCTR=prior year's total return×(1 plus TMC ROR)

14. TRU Monte TR—TRU Monte Total Return. TRUMonteTR=prior year's total return×(1 plus TRURatio ROR)

15. TRURatio=Total Return divided by Best Fit Line

16. Delta Par ROR—rate of return required for asset's TRURatio be at Par where TRURatio equals 1. Given by formula DeltaParROR=FV/PV $\hat{\ }$RN−1=1/TRURatio$\hat{\ }$RN−1.

17. RN—Reversion Number. Used like n is used in most financial formulas. RN is the number of years until the Asset will revert to par.

Figure 7:
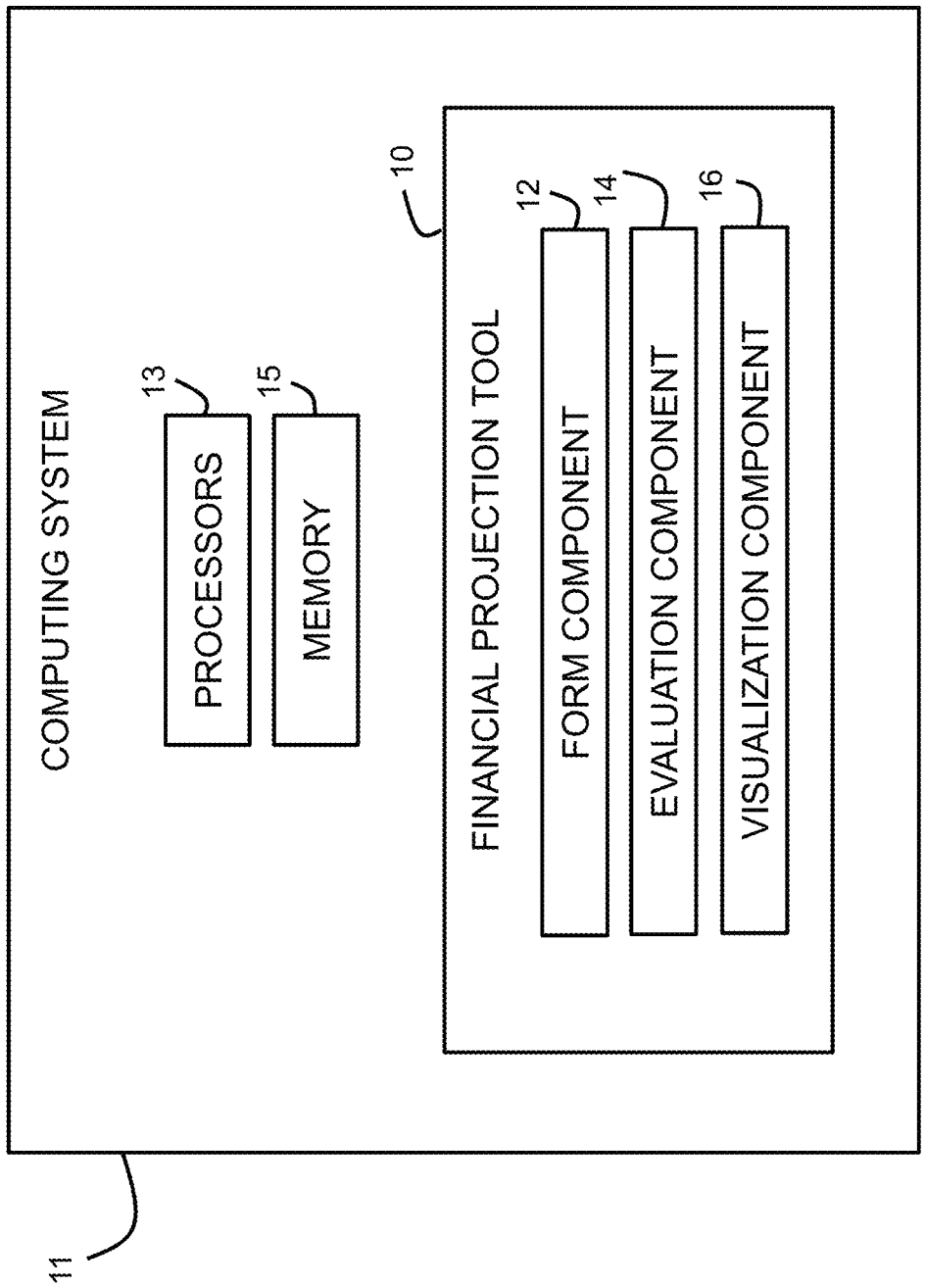
FIG. 7 is a schematic diagram of a system for financial projection, according to an embodiment.

18. TRURate=Best Fit ROR plus Delta Par ROR. Also called RAEROR or Reversion Adjusted Expected Rate of Return 19. Best Fit ROR=Slope of Best Fit line minus one. Also called IVROR or Internal Value Rate of Return As shown in FIG. 7, embodiments may provide a software tool that can be run on a computing system 11. Referring to FIG. 1, computing system 11 may be part of server computing device 112 and/or mobile computing device 102. Computing system 11 can further include processors 13 and memory 15. Memory 15 may comprise a non-transitory computer readable medium. Instructions stored within memory 15 may be executed by the one or more processors 13.

Computing system 11 may further include financial projection tool 10, also referred to simply as tool 10. As seen in FIG. 7, tool 10 includes at least an investor information input component 12, a trend reversion and current price deflection bias evaluation component 14, and a visualization component 16. In operation, form component 12 includes provisions for receiving information about an investor and the investor's investment account, which are discussed in further detail below. Evaluation component 14 includes provisions for evaluating the investment account and projecting rates of return, using trend reversion and current price deflection bias (also referred to as value-gap adjustment), as described below. Visualization component 16 includes provisions for visually indicating the output from the evaluation component 14.

Financial planning programs may use a Monte Carlo analysis to project possible future outcomes. An investor's information may be entered into the financial planning program, including date of birth, expected retirement age, current income and expense amounts, and expected future income and expense amounts. For each year from the current year through the expected mortality of the client, a Net Cash Flow can be calculated by subtracting Total Expenses from Total Income. Before retirement, the Net Cash Flow could be positive, and these savings could be added to the investor's retirement savings. Once the investor has retired, the Net Cash Flow could be negative, requiring a withdrawal from the investor's retirement savings.

An investor may have several retirement accounts. The current balances, taxability, and investment choices for each retirement account may be entered into a financial planning program. The annual withdrawal amount needed by the investor must be apportioned to the individual retirement accounts. In the early years, most withdrawals might be taken from one retirement account, with later withdrawals taken from a different account. This apportionment may be based on the taxability of the different types of retirement accounts or based on other factors.

Financial Projections Using Linear Returns

After the retirement account information has been entered and the withdrawals have been apportioned to the individual accounts, a simple projection can be created for each retirement account by subtracting the annual Net Cash Flow from the retirement account. For example, if an account starts with $100,000 and has an annual Net Cash Flow of a $5,000 withdrawal, the projected balances would change as follows: $100,000, $95,000, $90,000, and so on.

However, the retirement account most often would be invested in assets such as stocks or bonds. So, the projected balance would also be increased or decreased by the expected investment returns. Additionally, the withdrawals would be increased over time to account for future changes in inflation. So, given an expected return of 10% per year and an inflation adjustment of 3% per year, a projected balance could look like the following shown in Table 1:

TABLE 1

| Year | Balance | Withdrawal | Investment Return |
|---|---|---|---|
| 0 | $100,000 | $5,000 | $10,000 |
| 1 | $105,000 | $5,150 | $10,500 |
| 2 | $110,350 | $5,305 | $11,035 |
| 3 | $116,081 | $5,464 | $11,608 |
| 4 | $122,225 | $5,628 | $12,222 |
| 5 | $128,820 | $5,796 | $12,882 |

However, an investor and/or financial planner may want to see what happens if returns are much lower than 10%. The expected return used may vary based on what assets the account holds and the current outlook for the financial markets. So, embodiments could test several possibilities such as a return of 0%, 5%, and 10%. Projected balances could be estimated as shown in Table 2 (where "ROR" is rate of return):

TABLE 2

| Year | Balance with ROR 0% | Balance with ROR 5% | Balance with ROR 10% |
|---|---|---|---|
| 0 | $100,000 | $100,000 | $100,000 |
| 1 | $ 95,000 | $100,000 | $105,000 |
| 2 | $ 89,850 | $ 99,850 | $110,350 |
| 3 | $ 84,546 | $ 99,538 | $116,081 |
| 4 | $ 79,082 | $ 99,051 | $122,225 |
| 5 | $ 73,454 | $ 98,376 | $128,820 |

This type of linear projection is often used by businesses to project sales. Low, medium, and high growth rates are applied to the current sales numbers. A single linear projection may be used by financial planning programs, but it is typically intended just to show a conservative benchmark of where the retirement accounts might be in the future. In general, a linear projection may not be a realistic depiction of what will happen in the future. The financial markets typically do not move in a straight line. The volatility of the markets may therefore impact the future balances.

Financial Projections Using Historical Data

One way to approximate what might happen in the future is to utilize the data from the past, including the annual returns for all historical years that are available or for a few selected historical dates. Illustrating this approach, Table 3 below projects the same investor's balance using the historical returns for 1928 to 1932:

TABLE 3

| Year | Balance 1928 | Balance 1929 | Balance 1930 | Balance 1931 | Balance 1932 |
|---|---|---|---|---|---|
| 0 | $100,000 | $100,000 | $100,000 | $100,000 | $100,000 |
| 1 | $ 84,976 | $ 71,184 | $ 55,643 | $ 91,527 | $157,503 |
| 2 | $ 60,489 | $ 39,608 | $ 50,928 | $144,158 | $164,228 |
| 3 | $ 33,658 | $ 36,252 | $ 80,213 | $150,313 | $237,864 |
| 4 | $ 30,806 | $ 57,099 | $ 83,638 | $217,709 | $314,343 |
| 5 | $ 48,520 | $ 59,537 | $121,139 | $287,708 | $205,546 |

If the investor-specific information is eliminated to focus just on the returns, one can simply calculate the total return of one dollar. Along those lines, Table 4 below illustrates a starting balance of one dollar increased or decreased by each years' rate of return:

TABLE 4

| Year | Total Return 1928 | Total Return 1929 | Total Return 1930 | Total Return 1931 | Total Return 1932 |
|---|---|---|---|---|---|
| 0 | $1.00 | $1.00 | $1.00 | $1.00 | $1.00 |
| 1 | $0.85 | $0.71 | $0.56 | $0.92 | $1.58 |
| 2 | $0.60 | $0.40 | $0.51 | $1.44 | $1.64 |
| 3 | $0.34 | $0.36 | $0.80 | $1.50 | $2.38 |
| 4 | $0.31 | $0.57 | $0.84 | $2.18 | $3.14 |
| 5 | $0.49 | $0.60 | $1.21 | $2.88 | $2.06 |
| 6 | $0.51 | $0.86 | $1.60 | $1.88 | $2.63 |

Figure 8:
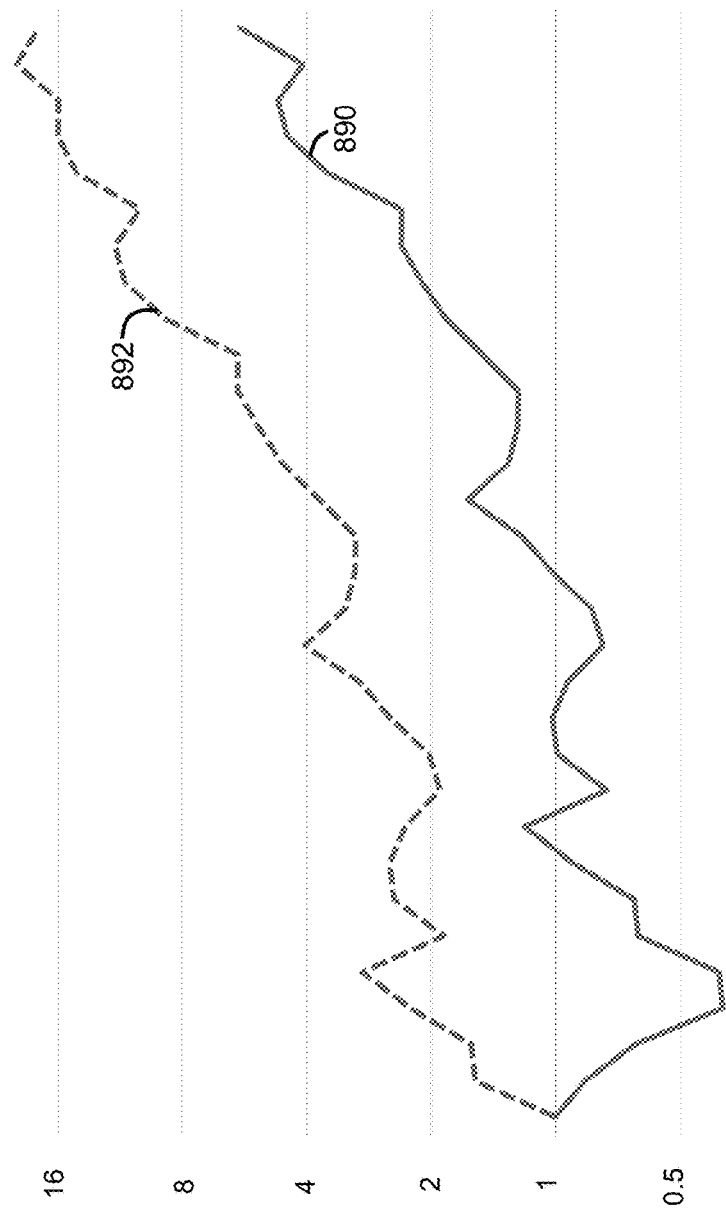
FIG. 8 is a graph illustrating historical total return rates for two years, 1928 and 1932, according to an embodiment.

FIG. 8 is a graph illustrating historical total return rates for two of those years, 1928 (see reference numeral 890) and 1932 (see reference numeral 892). The y-axis is log scaled base 2, and the x-axis indicates the number of years 0 to 30 or 1 to 31.

Figure 9:
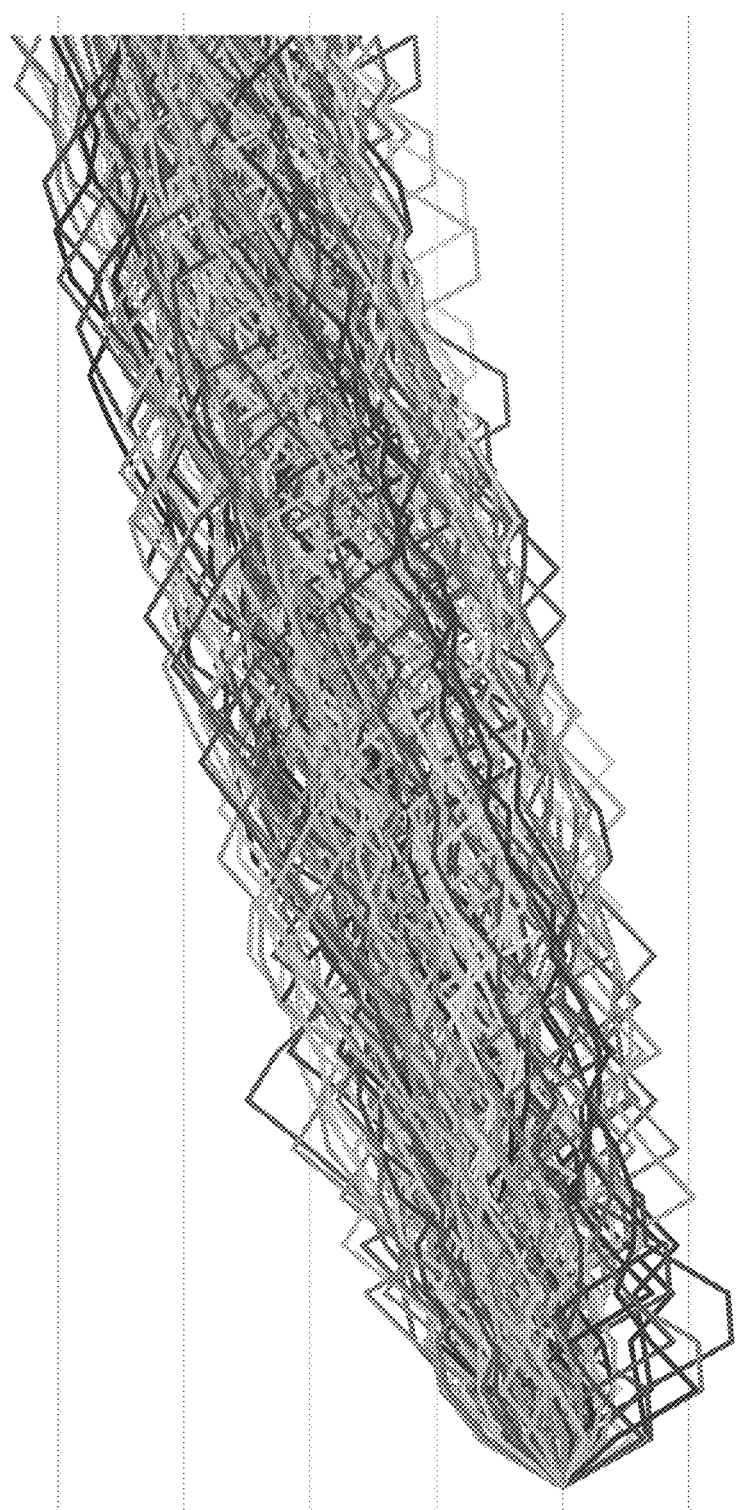
FIG. 9 is a graph illustrating total real return of historical data from 1801 to 1988, according to an embodiment.

FIG. 9 is a graph illustrating total real return of historical data from 1801 to 1988. All graphs included herein are real return unless otherwise stated. The results for nominal would likewise show the improvements of TRU Monte versus traditional Monte, described herein. Embodiments may provide a parameter to choose either real or nominal.

Limitations of Projections Using Historical Data

Historical testing may have limitations. There is data for Large Stocks, Treasury Bonds, and Treasury Bills going back to 1801. There is also historical data for Large Growth Stocks, Large Value Stocks, Small Growth Stocks, and Small Value Stocks, but only back to 1928. For some assets, such as International Stocks and Emerging Market Stocks, the historical data only goes back to 1970. If an investor needs a projection for 30 years, only start dates up to 1988 (2018 minus 30) can be used. A projection for International Stocks for 40 years could only use start dates from 1970 to 1978. That would only be nine tests, which may be insufficient to cover all that might happen in the future. A projection of Large Growth Stocks for 30 years could use the start dates from 1927 to 1988. The resultant 61 tests would cover most of what might happen in the future. But the tests might not cover every possible outcome.

Therefore, historical testing may have two limitations. First, the returns of the past do not encompass all that might happen. Secondly, the amount of historical data for many assets is limited. The present embodiments may provide different ways to project future returns.

Financial Projections Using Monte Carlo

Financial planning programs may use Monte Carlo analysis instead of historical testing. Monte Carlo analysis is used in many fields, e.g., to predict hurricane paths, population growth, commodity pricing, or numerous scientific phenomena. For projecting financial returns, a Monte Carlo analysis may use the formula for rate of return (ROR):

ROR=Drift plus Shock

Figure 10:
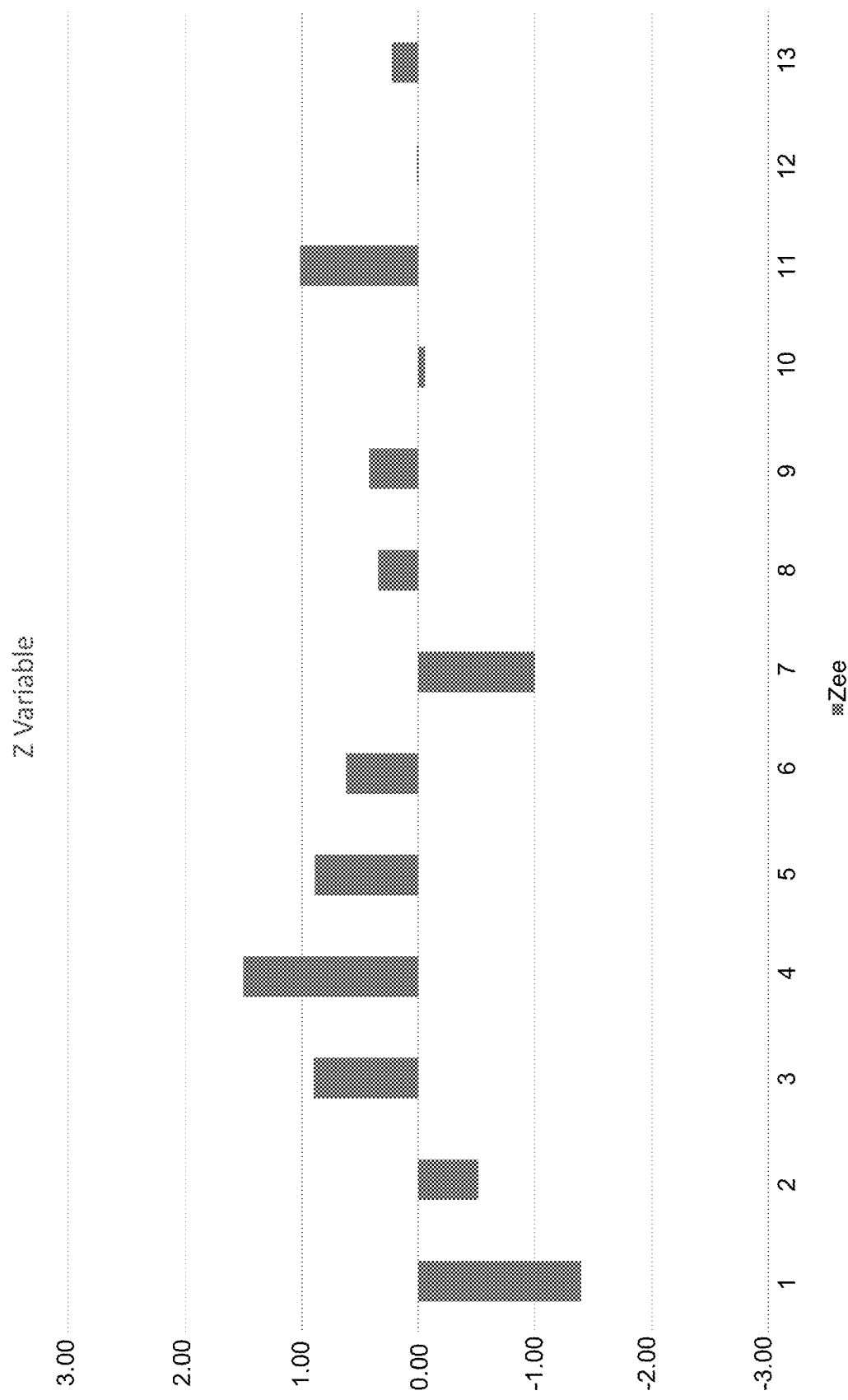
FIG. 10 is a graph illustrating representative generated random numbers, or Z variables, according to an embodiment.

In the above formula, Drift is the average rate of return and Shock is the standard deviation times a random variable Z. Assets with a higher average rate of return have a higher rate of return. Assets with a higher standard deviation will have rates of return that fluctuate more wildly. The Z variable may be generated by a spread sheet or by programming code. FIG. 10 is a graph illustrating representative Z variables. The array of Z variables is typically normally distributed. That is, the Z would range from −1 to 1 68% of the time, from −2 to 2 95% of the time, and from 3 to −3 99% of the time. A graph of the frequency would look like a bell curve.

The average rate of return and standard deviation may be calculated from the historical data that is available. Each test of the Monte Carlo analysis will produce a different result due to the random number generated. Using the same historical data with an average return of 0.09653 and a standard deviation of 0.17455 could generate total return results like those shown in Table 5 below:

TABLE 5

| Year | Total Return 101 | Total Return 102 | Total Return 103 | Total Return 104 | Total Return 105 |
| --- | --- | --- | --- | --- | --- |
| 0 | $1.00 | $1.00 | $1.00 | $1.00 | $1.00 |
| 1 | $1.23 | $0.98 | $1.12 | $1.08 | $1.30 |
| 2 | $1.20 | $1.09 | $1.20 | $1.40 | $1.72 |
| 3 | $1.34 | $1.18 | $1.57 | $1.85 | $2.09 |
| 4 | $1.45 | $1.53 | $2.07 | $2.25 | $2.62 |
| 5 | $1.88 | $2.02 | $2.51 | $2.82 | $3.32 |
| 6 | $2.49 | $2.46 | $3.15 | $3.58 | $2.63 |

Due to the random number generation, the results would be different for a subsequent run of the Monte Carlo analysis (e.g., spreadsheet is opened or refreshed) as shown in the exemplary results of Table 6 below:

TABLE 6

| Year | Total Return 101 | Total Return 102 | Total Return 103 | Total Return 104 | Total Return 105 |
| --- | --- | --- | --- | --- | --- |
| 0 | $1.00 | $1.00 | $1.00 | $1.00 | $1.00 |
| 1 | $1.08 | $0.97 | $1.28 | $1.07 | $0.83 |
| 2 | $1.04 | $1.24 | $1.37 | $0.89 | $0.70 |
| 3 | $1.34 | $1.33 | $1.15 | $0.75 | $0.95 |
| 4 | $1.43 | $1.11 | $0.96 | $1.02 | $1.08 |
| 5 | $1.20 | $0.93 | $1.31 | $1.16 | $0.93 |
| 6 | $1.00 | $1.27 | $1.49 | $1.00 | $1.20 |

Figure 24:
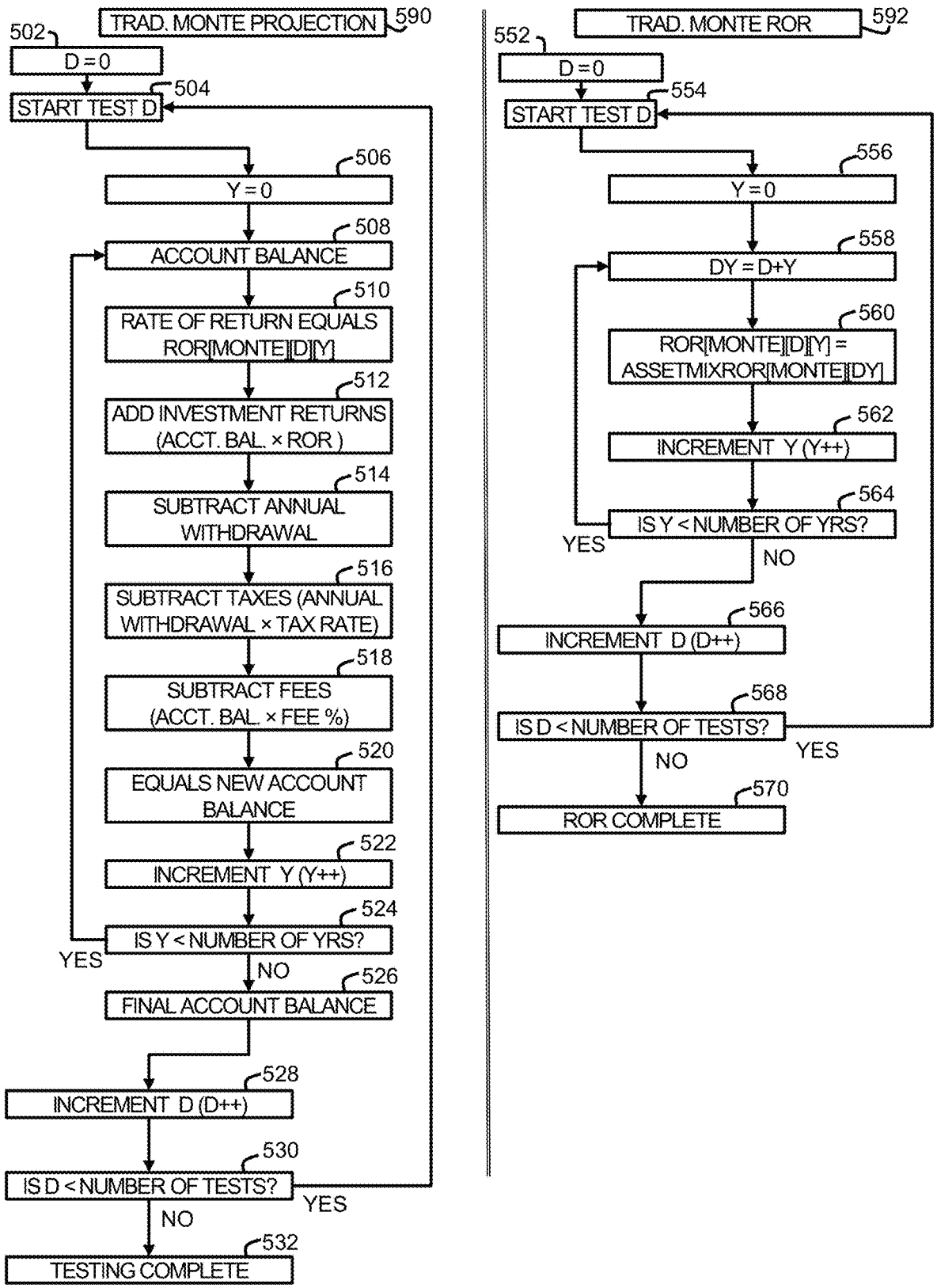
FIG. 24 is a flowchart illustrating exemplary methods for performing a traditional Monte Carlo projection, and for determining a traditional Monte Carlo ROR, according to embodiments.

FIG. 24 illustrates exemplary methods for performing a traditional Monte Carlo projection 590 at steps 502 through 532, and for determining a traditional Monte Carlo ROR 592 at steps 552 through 570, according to embodiments. The right side of FIG. 24 illustrates a method for determining ROR using traditional Monte Carlo techniques, for a designated number (D) of tests. The results of the traditional Monte Carlo ROR process are then used for the traditional Monte Carlo projection method on the left side of FIG. 24, at step 510. In embodiments, the information for step 560 of the traditional Monte Carlo ROR process is determined according to the traditional Monte Carlo simulation process 790 shown on the left side of FIG. 26 (steps 702 through 712).

In embodiments shown in FIG. 24, a method may begin with a customer's account balance, and then add investment returns, which may be determined by the current account balance multiplied by the rate of return. Then, then the customer's withdrawal, taxes, and fees may be subtracted, which results in an ending balance. That ending balance then becomes the starting balance for the next year. This process may be repeated for however many years the customer is expected to be retired. That whole process is then repeated D times, where D is the number of tests that are being run.

For a linear projection, the rate of return for each test may be a base amount plus an incremental amount for each test. For example, the base amount could be 0.05 and the increment could be 0.02. So, the first test would have a rate of return (ROR) of 0.05 and the second test would have a rate of return of 0.07.

However, for a traditional Monte Carlo projection, as shown in FIG. 24, a different rate of return may be used. For example, the rate of return may be the average rate of return plus the standard deviation multiplied by Z, as in the following formula: ROR=Avg ROR+(Std Dev×Z), where Z is a random number generated by the application.

As shown in FIG. 24, method 590 may begin in step 502 by setting D=0. D may be used as a counter for each test. Each test may sometimes be referred to as a distribution, which is why the letter D is used. With D set, method 590 may continue in step 504 by starting the test.

In step 506, method 590 sets Y=0. Y may be used as a count for the number of years. The first year may be 0. As an example, if a retiree is expected to be retired for 30 years, the last year Y will equal 30, and Y will therefore range from 0 to 30.

In step 508, method 590 may continue by determining the beginning account balance. The beginning account balance may be the same for each test based on the customer's current retirement savings. The balance for each test and each year can be described as balance[D][Y] where the indexes of the array indicate the current test—D—and the current year—Y. Alternatively, the type of test being run may be described as balance[HIST][D][Y] or balance[MONTE][D][Y].

In step 510, method 590 may continue by determining the MONTE rate of return that will be applied to this specific test in this specific year. This may be denoted as ROR[MONTE][D][Y].

In step 512, method 590 may continue by adding investment returns. The investment returns may be determined by the formula: BALANCE[MONTE][D][Y]×ROR[MONTE][D][Y]. For example, if a current balance is $100,000 and the Monte ROR is 5%, then the investment return will be $5,000.

In step 514, method 590 may continue by subtracting the customer's annual withdrawal. This may be denoted as WITHDRAWAL[Y]. This amount may be the same for each test, but may vary by year. In embodiments, this may be derived from the annual withdrawal amounts exported from an external financial planning application, or may be derived from an internal financial planning application. Alternatively, this may be input by a user.

In step 516, method 590 may continue by subtracting taxes. In embodiments, the amount of taxes may be the customer's tax rate multiplied by the withdrawal.

In step 518, method 590 may continue by subtracting fees. In embodiments, the amount of fees may be the fee percent multiplied by the customer's account balance.

In step 520, method 590 may continue by determining a new account balance, resulting from the previous steps 508 through 518. The new account balance may be the previous account balance plus the investment gain and minus the withdrawal, taxes, and fees. This amount may then become the account balance used at the beginning of the next year of the process.

In step 522, method 590 may continue by incrementing the Y counter to move the Y counter to the next year.

In step 524, if Y equals the number of years, then the calculations are stopped. Otherwise, method 590 continues by returning to step 508 to process the next year, as shown by the return loop in FIG. 24.

If Y equals the number of years and the calculations are stopped in step 524, the final account balance is obtained in step 526.

Method 590 may then continue in step 528 by incrementing the counter D to move the D counter to the next test.

In step 530, if D equals the number of tests, method 590 has completed the number of tests. Otherwise, method 590 proceeds to the next test and returns to step 504 as shown in the return loop of FIG. 24.

In step 532, the testing is complete. In embodiments, the number of tests may depend on the type of test being performed, e.g., a traditional Monte Carlo test, a historical test, or a linear test. A traditional Monte Carlo test, as is shown in FIG. 24, may be limited by the number of random variables Z created. A historical test may be limited based on the amount of historical data that is available. A linear test may not be limited, but is typically just 3 or 5 tests.

Turning now to the right side of FIG. 24, the method 592 for determining a traditional Monte Carlo ROR may begin in step 552 by setting counter D to 0, where D indicates the test number. With D set, method 592 may continue in step 554 by starting the test.

In step 556, method 592 may continue by setting counter Y to 0, where Y indicates the year.

Then, in step 558, method 592 may continue by calculating the DY variable as D+Y. For example, at the 3rd test and the 4th year, DY would equal 7.

In step 560, method 592 may continue by calculating the MONTEROR for this test and this year denoted by ROR [MONTE][D][Y]. This rate of return may equal the average rate of return plus the standard deviation times the zee variable, that is, ROR[MONTE][D][Y]=AVGROR+ STDDEV*ZEE[DY].

In step 562, method 592 may continue by incrementing the Y counter.

Then, in step 564, if Y is less than the number of years, method 592 may continue to the next year by returning to step 558, as shown by the return loop in FIG. 24. If Y equals the number of years, method 592 stops this process for this test, since the calculating of the rates of return for this test have been completed.

If Y equals the number of years in step 564, method 592 may then continue in step 566 by incrementing the counter D.

Then, in step 568, if D is less than the number of tests, method 592 may proceed to the next test by returning to step 554, as shown by the return loop in FIG. 24. Otherwise, method 592 continues to step 570 at which point the tests and the calculations of MONTE ROR are complete.

Shortcomings of Monte Carlo

If a chart is created comparing the historical total returns with those created with a Monte Carlo, the graphs should look similar. Because they are using the same average return and standard deviation, the Monte Carlo results should align with the historical results, but perhaps have a slightly wider range of outcomes.

Figure 11:
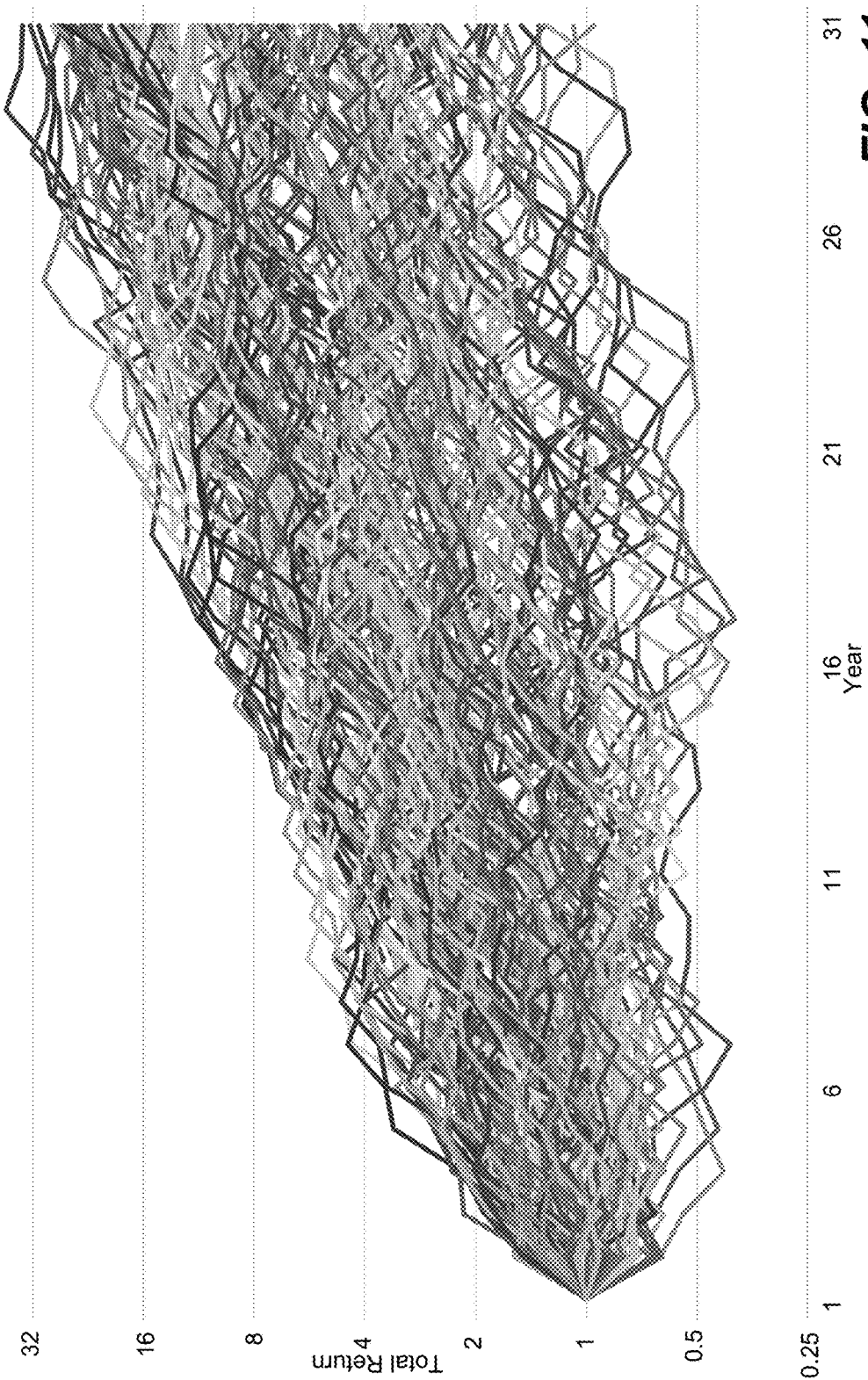
FIG. 11 is a graph illustrating an exemplary projected real total return Monte Carlo analysis, according to an embodiment.

In fact, as shown by comparing FIG. 9 to FIG. 11, what the traditional Monte Carlo analysis creates is significantly wider than what has happened historically. FIG. 11 illustrates an exemplary projected real total return Monte Carlo analysis for the 30-year time periods, while FIG. 9 illustrates the actual historical total real returns that occurred. As shown, the Monte Carlo analysis includes extreme high and low variations that are absent from the actual historical results. This comparison demonstrates that the historic fluctuations in the stock market were not as extreme as a Monte Carlo analysis would suggest. The present embodiments address that flaw in how a traditional Monte Carlo analysis is constructed, and in doing so provide more accurate projections using less processing resources and processing time.

Trend Reversion to the Mean

The present embodiments recognize that the stock market has a distinguishable internal value line. The total return of the stock market fluctuates above and below this internal value line. Aspects of this internal valuation are described in the related U.S. Published Patent Applications Nos. US2016/0358265 and US2014/0101073, which are herein incorporated by reference in their entirety.

Figure 12:
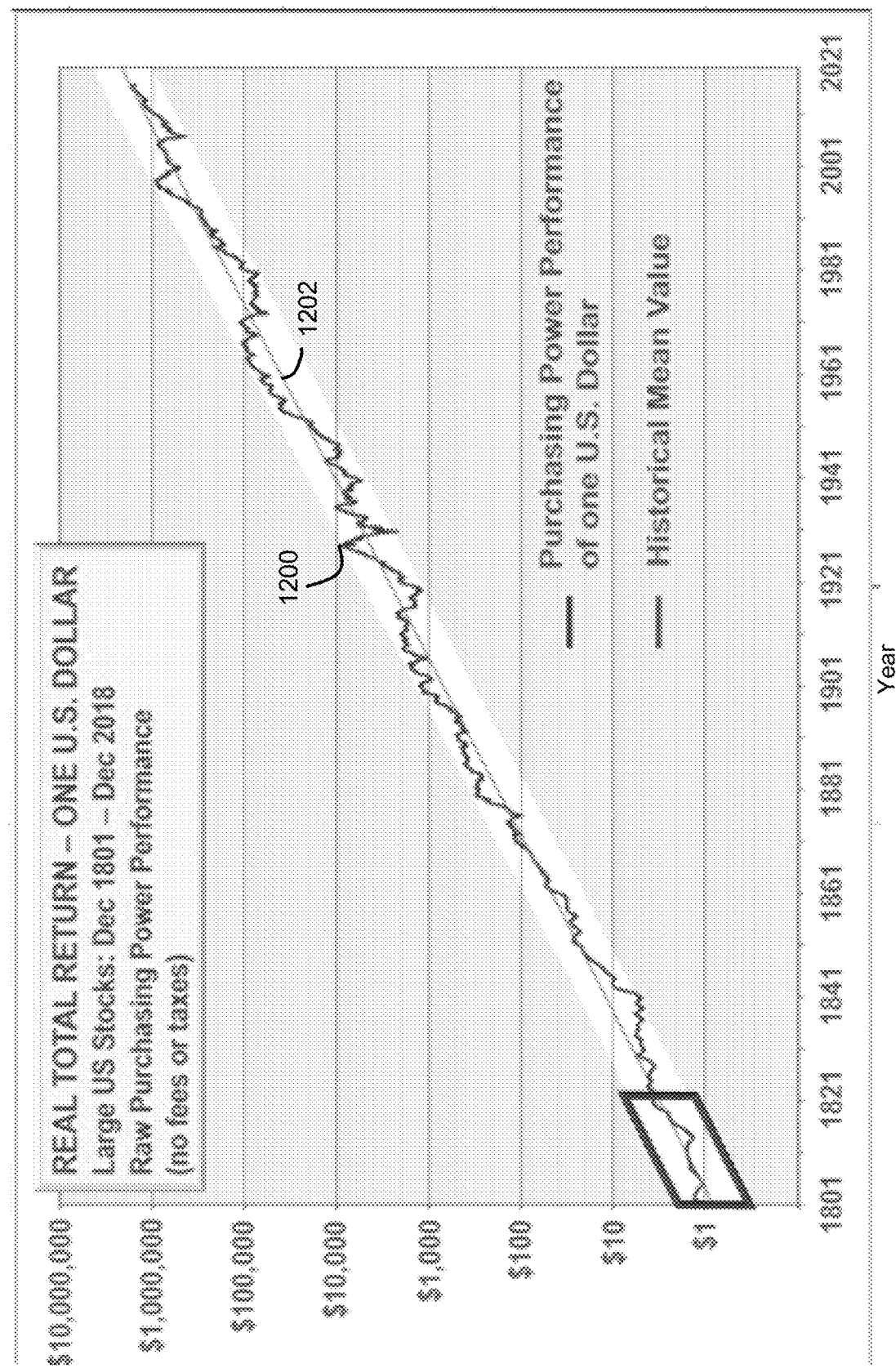
FIG. 12 is a graph illustrating a total real return line for Large U.S. Stocks from December 1801 through December 2018, along with the historical mean value line during that time, according to an embodiment.

As an example of internal valuation and reversion-to-the-mean, FIG. 12 illustrates the total real return line 1200 for Large U.S. Stocks from December 1801 through December 2018, along with the historical mean value line 1202 during that time.

Figure 13:
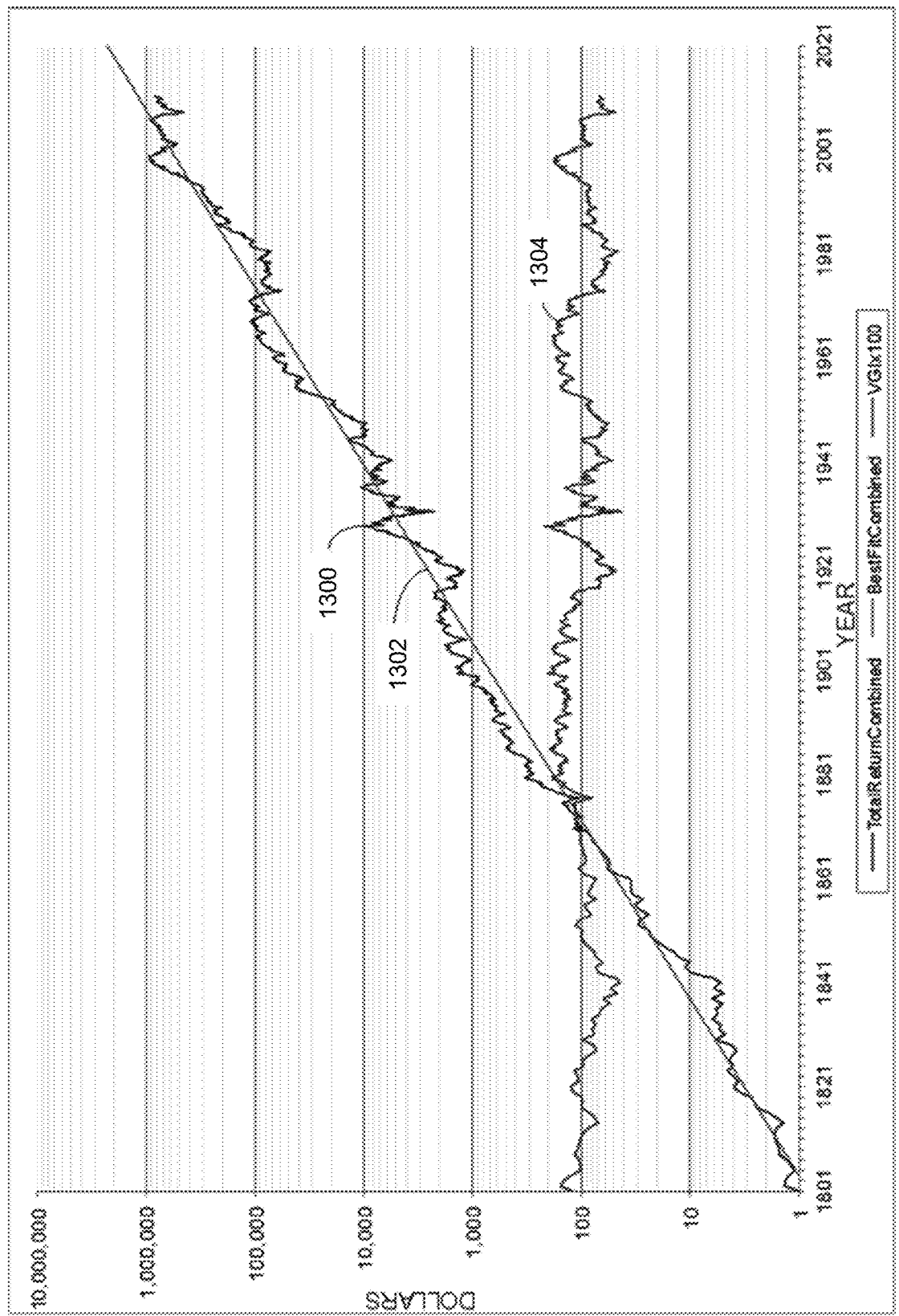
FIG. 13 is a graph illustrating over 200 years of U.S. stock market performance, shown as the growth of a theoretical dollar invested in the year 1801, represented by the total real return line, according to an embodiment.

As another example, FIG. 13 is a graph illustrating over 200 years of U.S. stock market performance, shown as the growth of a theoretical dollar invested in the year 1801, represented by the total real return line 1300. Total real return line 1300 is shown on a logarithmic scale and graphed as real total return, i.e., with dividends reinvested and inflation taken out to show only true performance, and with no real-world costs such as taxes or transaction costs. The straight trend line 1302 represents the internal value, and may be a logarithmic regression line, calculated as the mathematical "best fit" of the data shown by the total return line 1300. As seen, the trend line 1302 demonstrates a consistent 200-year market trend, with the price reverting to a trend represented by line 1302. On a logarithmic graph, the slope of a best fit straight line, determined in this case by logarithmic regression, correlates or approximates the average rate of return for the period. The best fit has two components: slope and Y-Intercept. If Y-Intercept is higher than the starting value, then slope is slightly flatter than the rate of return. In FIG. 13, the slope of line 1302 is roughly 6.7%.

A "value gap" may be determined by observing the difference in the value of the portfolio relative to a market trend line used to estimate internal value. For example, referring to FIG. 13, the value gap may be represented by the line 1304, which is determined by the proportional difference between the total return line 1300 and the trend line 1302. The proportional difference between the total return line 1300 and the trend line 1302 is represented by line 1304, referred to herein as the value gap index line 1304. The value gap may also be characterized in terms of a TRURatio, as described below.

Referring again to FIG. 12, in the present embodiments, the amount of deflection of the total real return line 1200 above or below the internal value line 1202 is referred to herein as the TRURatio. The TRURatio is calculated by Real Total Return divided by internal value line 1202, or Best Fit line. The best fit line is given by the formula Best Fit=Y-Intercept times Slope to the N, where N is the number of years since the first historical date. The Y-Intercept and Slope can be calculated, for example, by the Log Est formula in Microsoft Excel™ or by an iterative process that optimizes the Best Fit Line. The Real Total Return may be calculated by starting with one dollar in the first historical year, then adding each year's historical return (both change in price and dividend yield), and then adjusting the total return for inflation.

Figure 14:
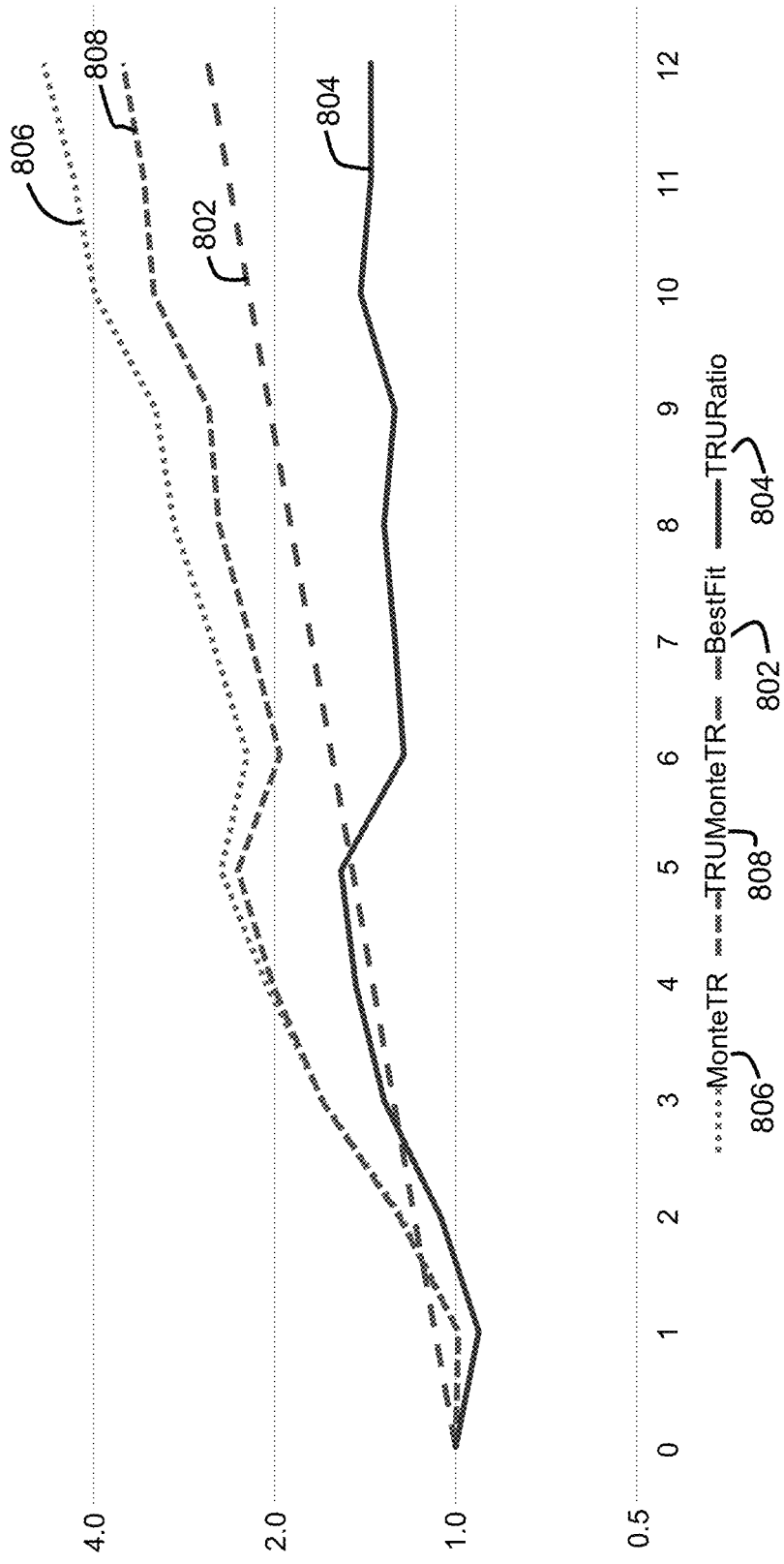
FIG. 14 is a graph illustrating the total return for a traditional Monte and for a TRU Monte according to an embodiment.

FIG. 14 is a graph illustrating the total return for a traditional Monte Carlo and for a TRU Monte according to the present embodiments. The best fit 802 is the total return of the average return. TRURatio 804 is the Total Return divided by the best fit 802. In this example, the traditional Monte Carlo 806 is above the best fit line 802, so the TRURatio 804 is over one. In FIG. 8, the results of the TRU Monte 808 are lower than the traditional Monte Carlo 806 because the Delta Par ROR (which is how much the stock market must move in order for the TRURatio to be at Par, and is negative in this example) is added.

Figure 15:
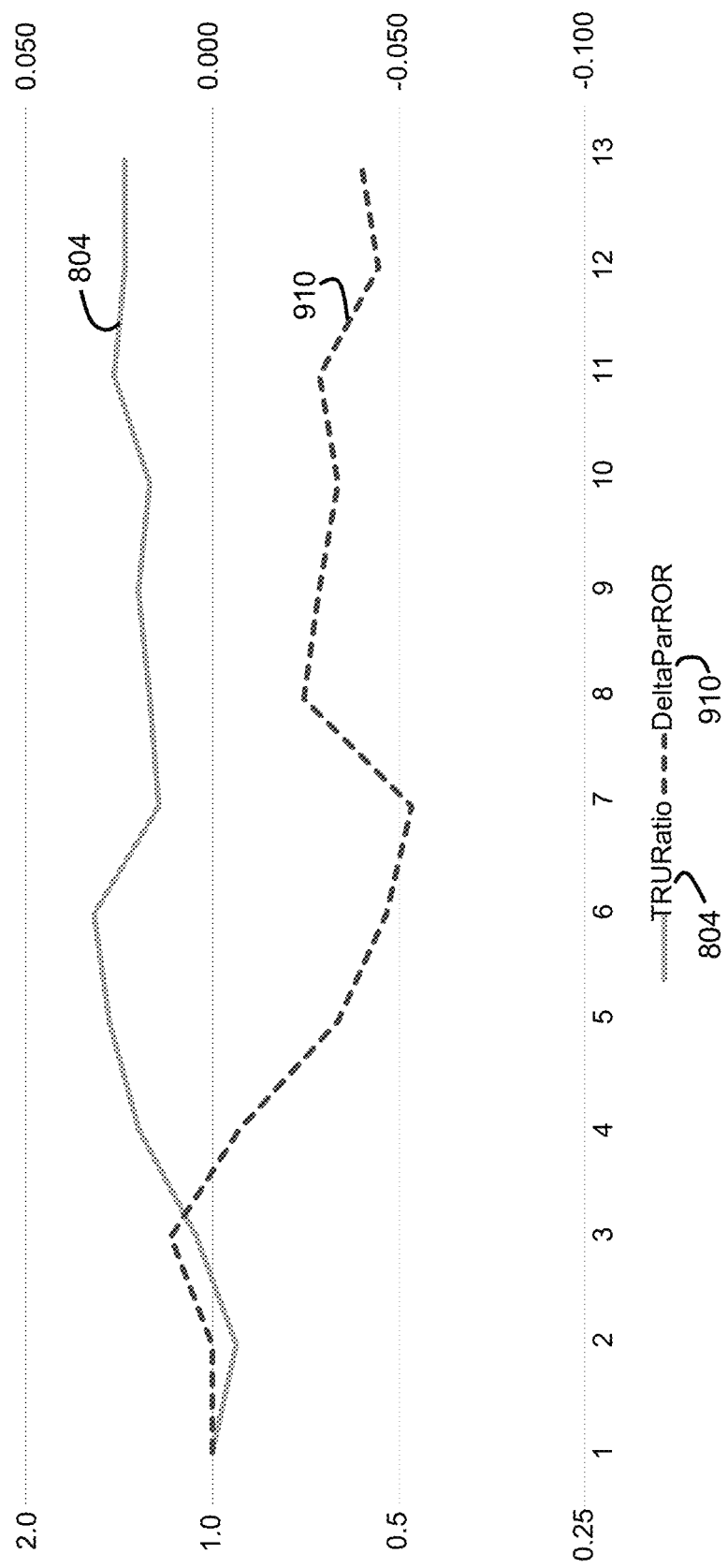
FIG. 15 is a graph illustrating a TRURatio and a Delta Par ROR, according to an embodiment.

FIG. 15 is a graph illustrating the TRURatio 804 and the Delta Par ROR 910 (which is scaled to the right y axis). If TRURatio 804 is over one, the Delta Par ROR 910 is negative.

As shown in FIGS. 14 and 15, when the TRURatio is above 1, the market may be considered overpriced and there will be a tendency for the market to move downwards until the TRURatio is at 1. The present embodiments refer to a TRURatio that equals one as "at Par." When the TRURatio is below par, the market may be considered underpriced and there will be a tendency for the market to move upwards until the TRURatio is at Par. The stock market will grow by its internal value line plus this additional tendency or force. The present embodiments refer to this extra return as "Delta Par," which as explained above is how much the stock market must move in order for the TRURatio to be at Par. The inverse of the TRURatio is the TRUFactor. That is, TRUFactor=1/TRURatio.

For example, if the market is underpriced and the TRURatio is 0.8, then the market would have to go up 25% to get to Par: 0.8×(1+0.25)=1. If the market is overpriced and the TRURatio is 1.6, then the market would have to go down by 37.5% for the market to be at Par: 1.6×(1+−0.375)=1. Table 7 below illustrates those conditions:

TABLE 7

| TRURatio | 0.8 | 1.6 |
| TRUFactor | 1.25 | 0.625 |
| DeltaPar | 0.25 | −0.375 |
| Delta Par PlusOne | 1.25 | 0.625 |
| Par | 1 | 1 |

Delta Par ROR would be the return to get to Par in a given number of years, or RN (reversion number of years).

Delta Par ROR may be calculated by Delta Par ROR=(1/TRURatio)^RN. This is a basic financial ROR formula, e.g., ROR=(FV/PV)^n. For Delta Par ROR, the Future Value (FV) is Par or 1. The Present Value (PV) is the current TRURatio. The n is RN, which is reversion number of years. The RN may be determined by looking at the historical data and calculating how long the asset's TRURatio stayed above one or below one.

Figure 25:
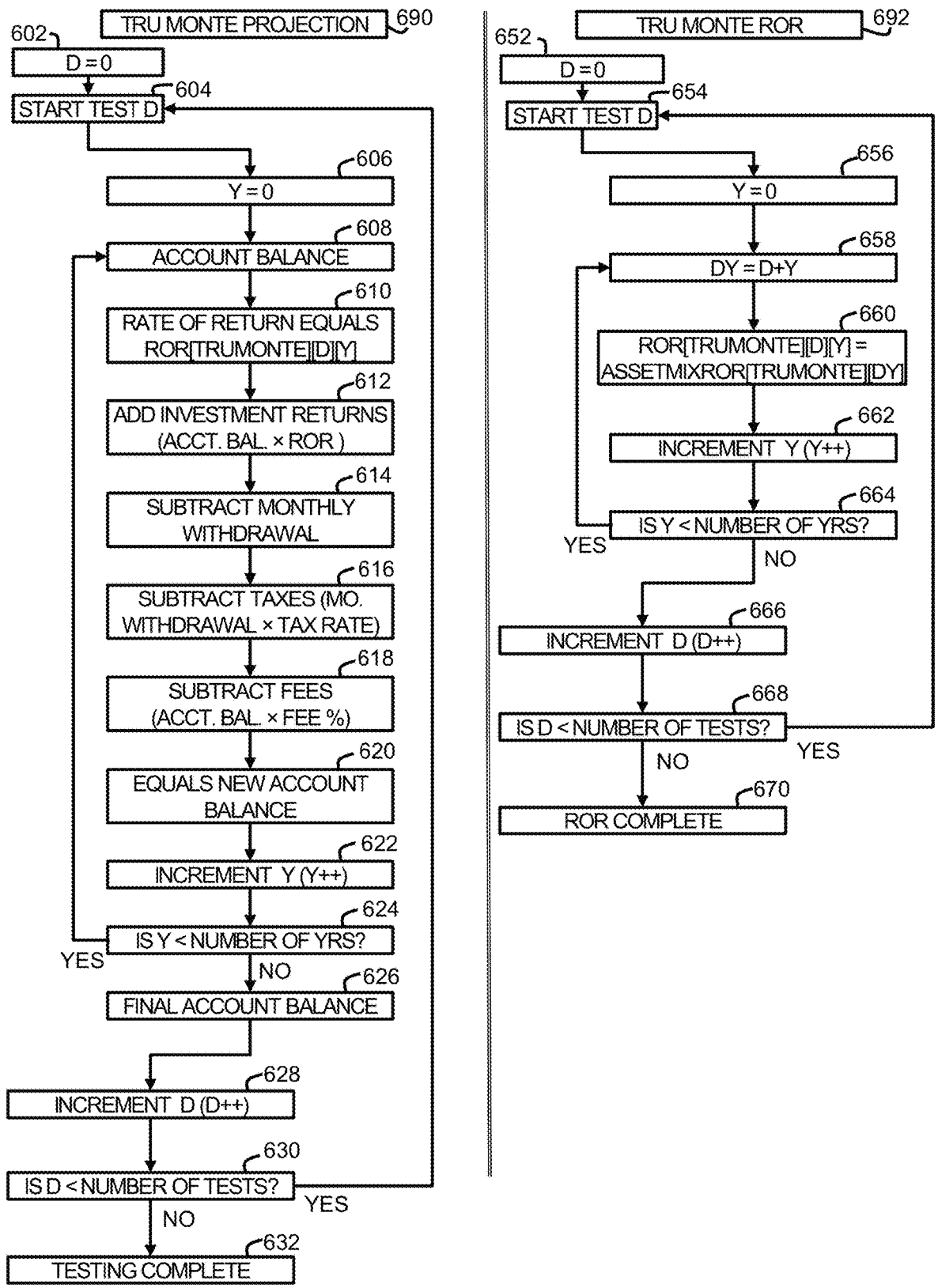
FIG. 25 is a flowchart illustrating exemplary methods for performing a modified simulation projection (e.g., TRU Monte Carlo projection), and for determining a modified Monte Carlo ROR (e.g., TRU Monte Carlo ROR), according to embodiments.

FIG. 25 illustrates exemplary methods for performing a modified simulation projection 690 (e.g., TRU Monte Carlo projection) at steps 602 through 632, and for determining a modified Monte Carlo ROR 692 (e.g., TRU Monte Carlo ROR) at steps 652 through 670, according to embodiments. The right side of FIG. 25 illustrates a method for determining ROR using modified simulation techniques, for a designated number (D) of tests. The results of the modified ROR process are then used for the modified simulation projection method on the left side of FIG. 25, at step 610. In embodiments, the information for step 560 of the traditional Monte Carlo ROR process is determined according to the traditional Monte Carlo simulation process 792 shown on the left side of FIG. 26 (step 752 through 782).

In embodiments shown in FIG. 25, a method may begin with a customer's account balance, and then add investment returns, which may be determined by the current account balance multiplied by the rate of return. Then, then the customer's withdrawal, taxes, and fees may be subtracted, which results in an ending balance. That ending balance then becomes the starting balance for the next year. This process may be repeated for however many years the customer is expected to be retired. That whole process is then repeated D times, where D is the number of tests that are being run.

For a modified simulation projection, the rate of return for each test may be the same rate of return as a traditional Monte Carlo projection (e.g., ROR=Avg ROR+(Std Dev×Z)), but may add the Delta Par ROR. The Delta Par ROR may be the return that will move the total return towards par over RN number of years. RN—reversion number of years—may be calculated for different investment assets by looking at the average amount of time it takes an asset to return to the par line. Therefore, Delta Par may equal FV/PV^1/RN−1, where FV equals 1 or par, PV equals current TRURatio and RN is the reversion number of years.

As shown in FIG. 25, method 690 may begin in step 602 by setting D=0. D may be used as a counter for each test. Each test may sometimes be referred to as a distribution, which is why the letter D is used. With D set, method 690 may continue in step 604 by starting the test.

In step 606, method 690 sets Y=0. Y may be used as a count for the number of years. The first year may be 0. As an example, if a retiree is expected to be retired for 30 years, the last year Y will equal 30, and Y will therefore range from 0 to 30.

In step 608, method 690 may continue by determining the beginning account balance. The beginning account balance may be the same for each test based on the customer's current retirement savings. The balance for each test and each year can be described as balance[D][Y] where the indexes of the array indicate the current test—D—and the current year—Y. Alternatively, the type of test being run may be described as balance[HIST][D][Y] or balance[TRUMONTE][D][Y].

In step 610, method 690 may continue by determining the TRU MONTE rate of return that will be applied to this specific test in this specific year. This may be denoted as ROR[TRUMONTE][D][Y].

In step 612, method 690 may continue by adding investment returns. The investment returns may be determined by the formula: BALANCE[TRUMONTE][D][Y]×ROR

[TRUMONTE][D][Y]. For example, if a current balance is $100,000 and the TRU Monte ROR is 5%, then the investment return will be $5,000.

In step 614, method 690 may continue by subtracting the customer's annual withdrawal. This may be denoted as WITHDRAWAL[Y]. This amount may be the same for each test, but may vary by year. In embodiments, this may be derived from the annual withdrawal amounts exported from an external financial planning application, or may be derived from an internal financial planning application. Alternatively, this may be input by a user.

In step 616, method 690 may continue by subtracting taxes. In embodiments, the amount of taxes may be the customer's tax rate multiplied by the withdrawal.

In step 618, method 690 may continue by subtracting fees. In embodiments, the amount of fees may be the fee percent multiplied by the customer's account balance.

In step 620, method 690 may continue by determining a new account balance, resulting from the previous steps 608 through 618. The new account balance may be the previous account balance plus the investment gain and minus the withdrawal, taxes, and fees. This amount may then become the account balance used at the beginning of the next year of the process.

In step 622, method 690 may continue by incrementing the Y counter to move the Y counter to the next year.

In step 624, if Y equals the number of years, then the calculations are stopped. Otherwise, method 690 continues by returning to step 608 to process the next year, as shown by the return loop in FIG. 25.

If Y equals the number of years and the calculations are stopped in step 624, the final account balance is obtained in step 626.

Method 690 may then continue in step 628 by incrementing the counter D to move the D counter to the next test.

In step 630, if D equals the number of tests, method 690 has completed the number of tests. Otherwise, method 690 proceeds to the next test and returns to step 604 as shown in the return loop of FIG. 25.

In step 632, the testing is complete. In embodiments, the number of tests may depend on the type of test being performed, e.g., a traditional Monte Carlo test, a historical test, a linear test, or a modified Monte Carlo test as is shown in FIG. 25. A traditional Monte Carlo test may be limited by the number of random variables Z created. A historical test may be limited based on the amount of historical data that is available. A linear test may not be limited, but is typically just 3 or 5 tests.

Turning now to the right side of FIG. 25, the method 692 for determining a TRU Monte Carlo ROR may begin in step 652 by setting counter D to 0, where D indicates the test number. With D set, method 692 may continue in step 654 by starting the test.

In step 656, method 692 may continue by setting counter Y to 0, where Y indicates the year.

Then, in step 658, method 692 may continue by calculating the DY variable as D+Y. For example, at the 3rd test and the 4th year, DY would equal 7.

In step 660, method 692 may continue by calculating the TRUMONTEROR for this test and this year denoted by ROR[TRUMONTE][D][Y]. The TRU Monte rate of return may equal the average rate of return plus the standard deviation times the zee variable, that is, ROR[MONTE][D][Y]=AVGROR+STDDEV*ZEE[DY]. Also calculated is the Delta Par rate of return denoted by DELTAPAR[D][Y]. The Delta Par rate of return may be the amount of return necessary to move the total return to the best fit line in a specified number of years. The specified number of years may depend on the customer's asset mix and is called RN (see FIG. 26).

In step 662, method 692 may continue by incrementing the Y counter.

Then, in step 664, if Y is less than the number of years, method 692 may continue to the next year by returning to step 658, as shown by the return loop in FIG. 25. If Y equals the number of years, method 692 stops this process for this test, since the calculating of the rates of return for this test have been completed.

If Y equals the number of years in step 664, method 692 may then continue in step 666 by incrementing the counter D.

Then, in step 668, if D is less than the number of tests, method 692 may proceed to the next test by returning to step 654, as shown by the return loop in FIG. 25. Otherwise, method 692 may continue to step 670 at which point the tests and the calculations of TRU MONTE ROR are complete.

TRU Monte: Reversion Adjusted and Current TRURatio-Biased

Using the Delta Par ROR, the present embodiments address the shortcomings of traditional Monte Carlo analyses, and may provide more accurate results, more quickly, in fewer processing steps, and using less computer processing resources. According to embodiments, the Delta PAR ROR is added to the Monte ROR based on the prior year's TRURatio. The TRURatio may be calculated from the Monte Total Return divided by the Monte Best Fit Line for each individual test. The Monte Best Fit may be the Y-Intercept times Slope A n, where n may be the number of years since the start of the test, and the slope may be the average return for the asset, which is the same as the drift used by the Monte ROR. In general, the Y-Intercept may be 1.

In some embodiments, the Y-Intercept may not be 1. For example, if an investor and/or financial planner wants to bias the Monte Carlo based on the market's current TRURatio, the Y-Intercept may be adjusted. This current TRURatio bias is also referred to herein as deflection bias. If the Y-Intercept is above 1, then the TRURatio will start out as below one, i.e., underpriced. If the Y-Intercept is below 1, then the TRURatio will start out as above one, i.e., overpriced. Therefore, the investor and/or financial planner may set the Y-Intercept to 1/TRURatio.

As an example, embodiments may implement the above trend reversion and deflection bias as illustrated in the following quasi-programming code:

```
For ( t = 0; t < numberoftests; t++ ) {
For ( clyr = 0; clyr <=30 ; clyr ++ ) {
Pyr = clyr-1 // prior year
z = clyr + t // the index for pulling from the Z Array
If(clyr==0) { // in first year we just set starting balances
TMCTR[t][clyr] = 1
TRUMonteTR[t] [clyr] = 1
DeltaParROR[t] [clyr] = 0
}
Else {
TMCROR[t] [clyr] = AssetAvgROR + AssetStandardDeviation × Z[z]
BF[t] [clyr] = TRUMonteYIntercept × Slope ^ clyr
TRURatio[t] [clyr] = TRUMonteTR[t] [clyr] /BF[t] [clyr]
DeltaParROR[t] [clyr] = (FV/PV)^rn - 1 = (1/TRURatio[t] [clyr])^rn - 1
TRUMonteROR[t] [clyr] = TMCROR[t] [clyr] + DeltaParROR[t] [pyr]
TMCTR[t] [clyr] = TMCTR[t] [pyr]*(1+TMCROR[t] [clyr])
TRUMonteTR[t] [clyr] = TRUMonteTR[t] [pyr]*(1+TRUMonteROR[t] [clyr])
}
}
}
```

Referring to FIG. 7, financial projection tool 100 could execute the above code according to an embodiment, and may function more efficiently (e.g., in terms of processing steps, memory usage, and processing speed) than traditional Monte Carlo tools.

Figure 16:
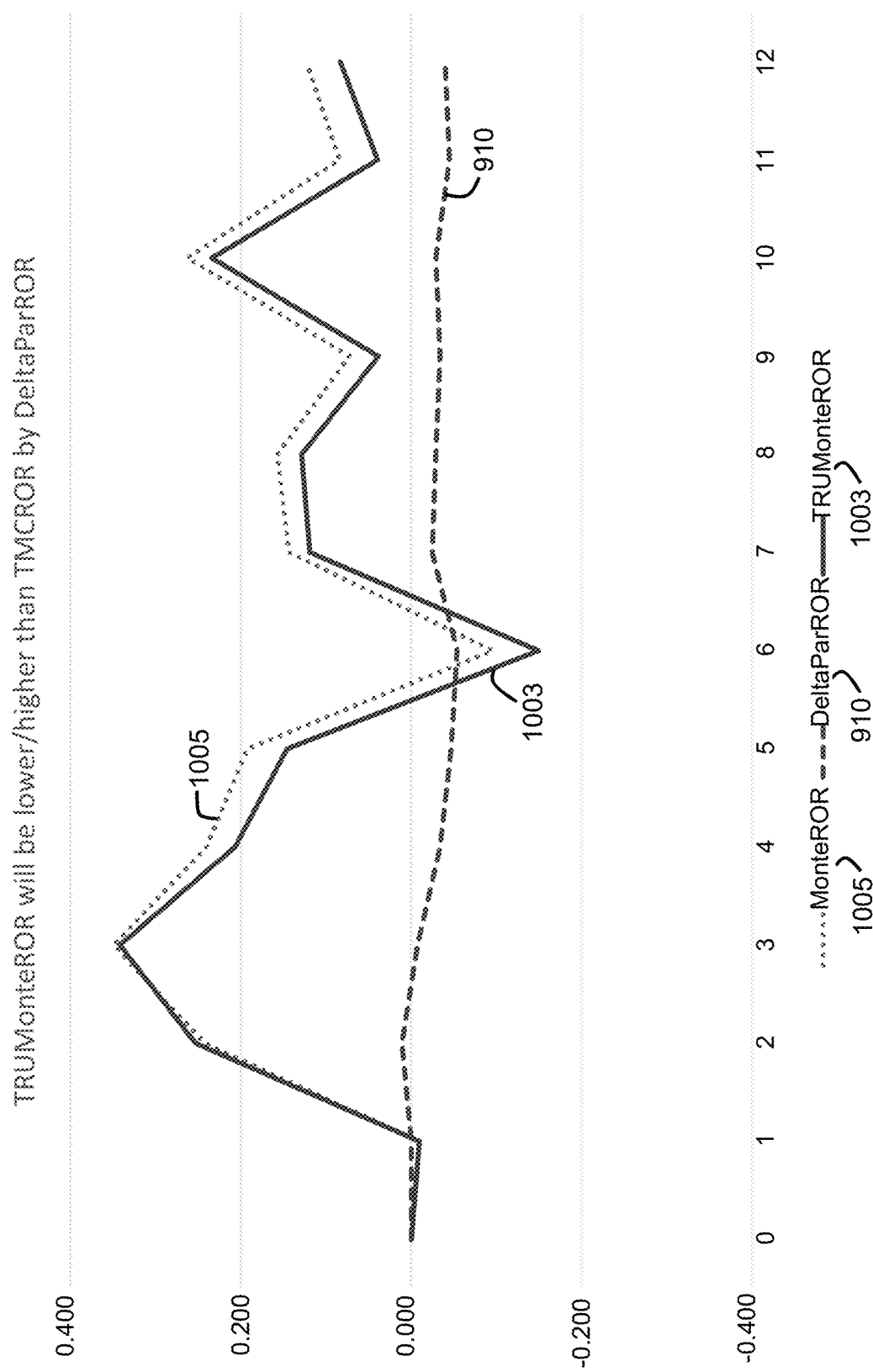
FIG. 16 is a graph illustrating Rates of Return (ROR) for traditional Monte, for Delta Par, and for a TRU Monte according to an embodiment.

As shown in FIG. 16, the annualized rate of return may be different for the traditional Monte Carlo ROR 1005 and the TRU Monte ROR 1003, with the difference being the Delta Par ROR 910. Referring to FIG. 10, Z is the random number generated, which creates the Monte Carlo ROR, where traditional Monte Carlo ROR equals average return plus (standard deviation times Z). In this particular test, the Z was positive in year 4, negative in year 7, etc. This lines up with the shape of the Monte Carlo ROR 1005 in FIG. 16.

Figure 17:
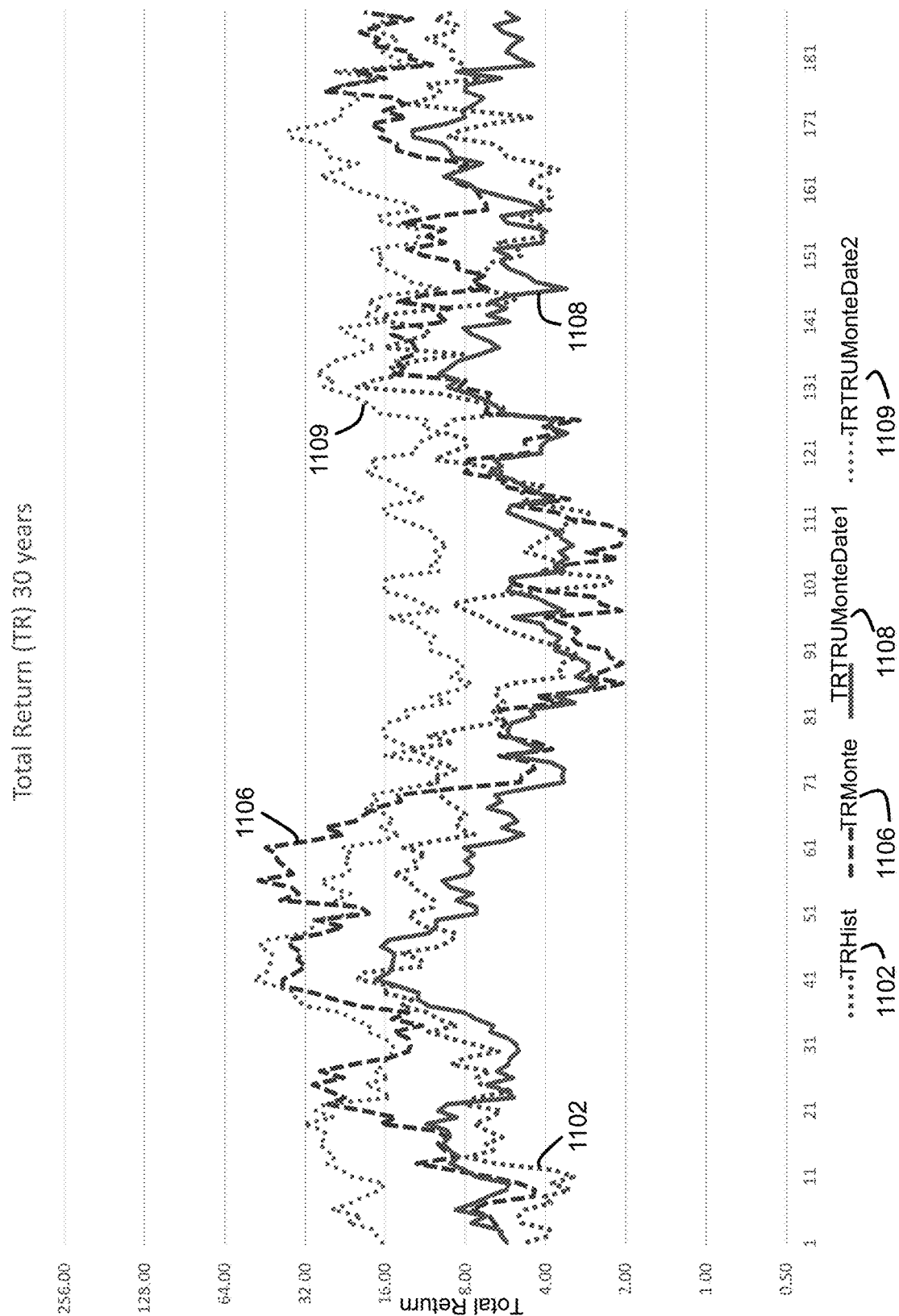
FIG. 17 is a graph illustrating final total returns for year 30 for historical data, for traditional Monte, and for two TRU Monte analyses according to embodiments.

FIG. 17 is a graph comparing the final total returns for year 30 for historical data, traditional Monte Carlo, and two TRU Monte. Line 1108 represents the TRU Monte biased based on Date 1 (the year 1928). Line 1109 represents the TRU Monte biased based on Date 2 (the year 1932). In implementations, graphs such as FIG. 17 may change each time the spreadsheet software generating the graphs is opened or updated, because the Traditional Monte and TRU Monte use random numbers that change each time the spreadsheet is opened or changed.

Figure 18:
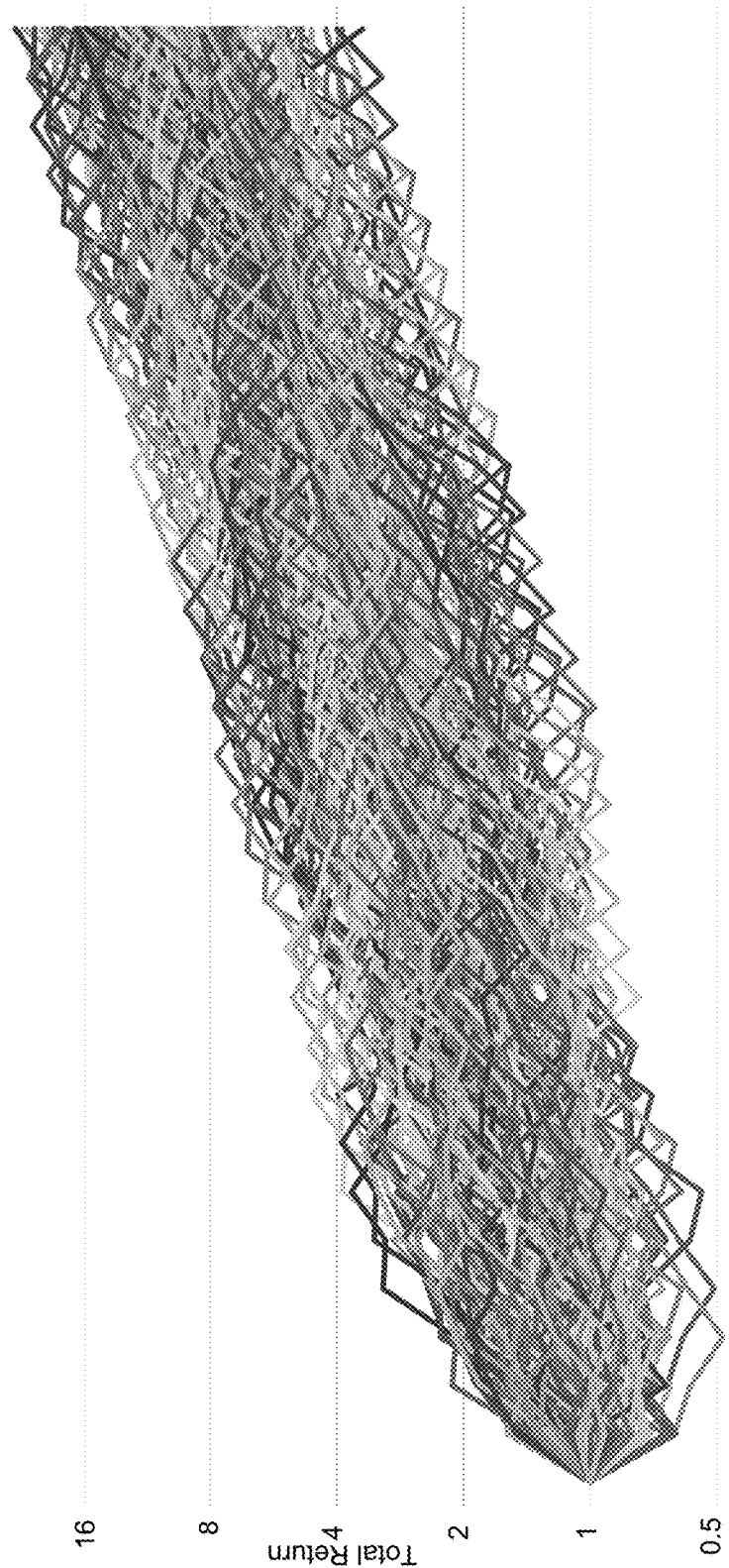
FIG. 18 is a graph illustrating real total return for 30 years of TRU Monte, according to an embodiment.
Figure 19:
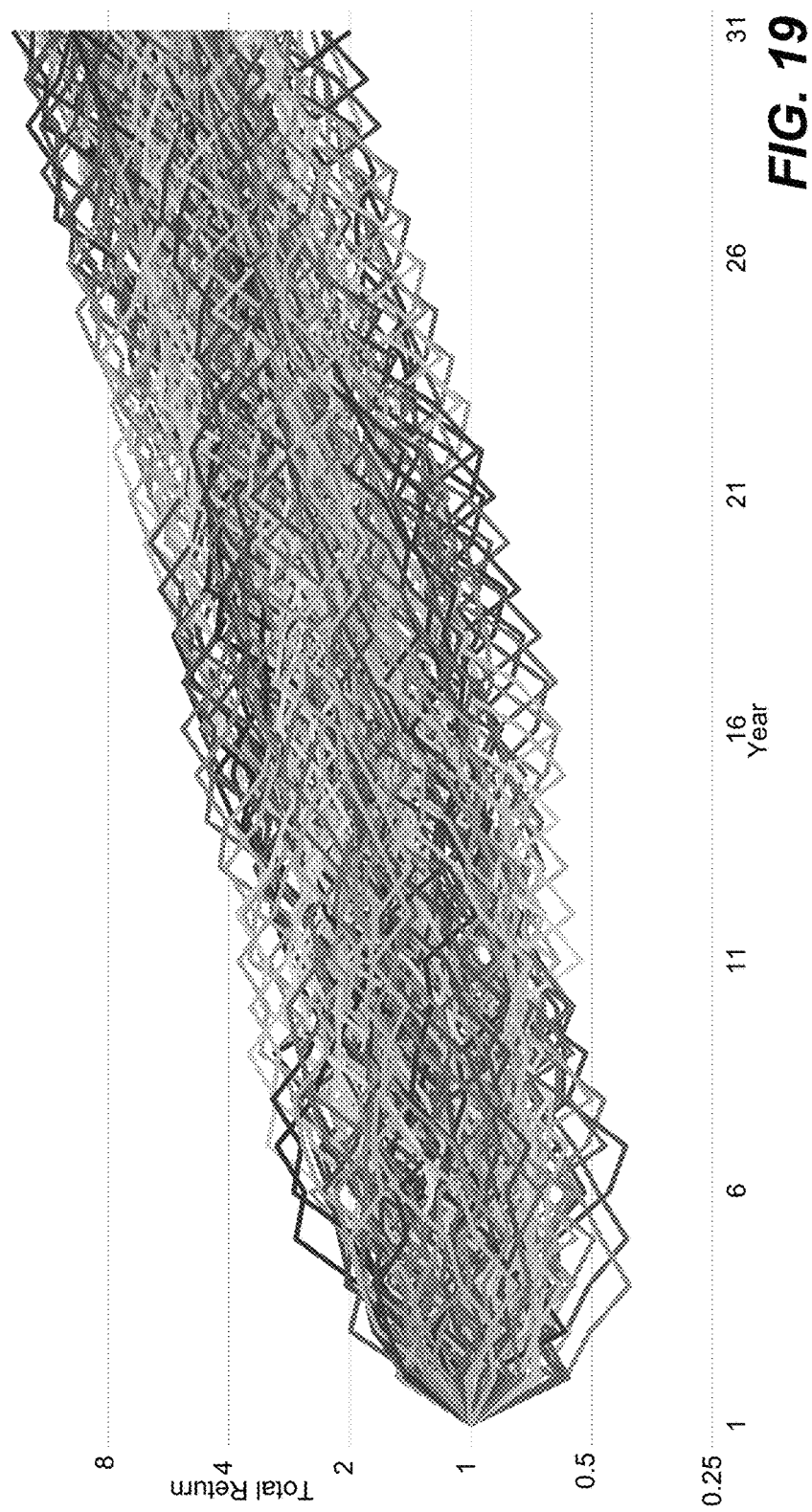
FIG. 19 is a graph illustrating real total return for 30 years of TRU Monte, which is deflection biased based on Date 1, the year 1928, according to an embodiment.
Figure 20:
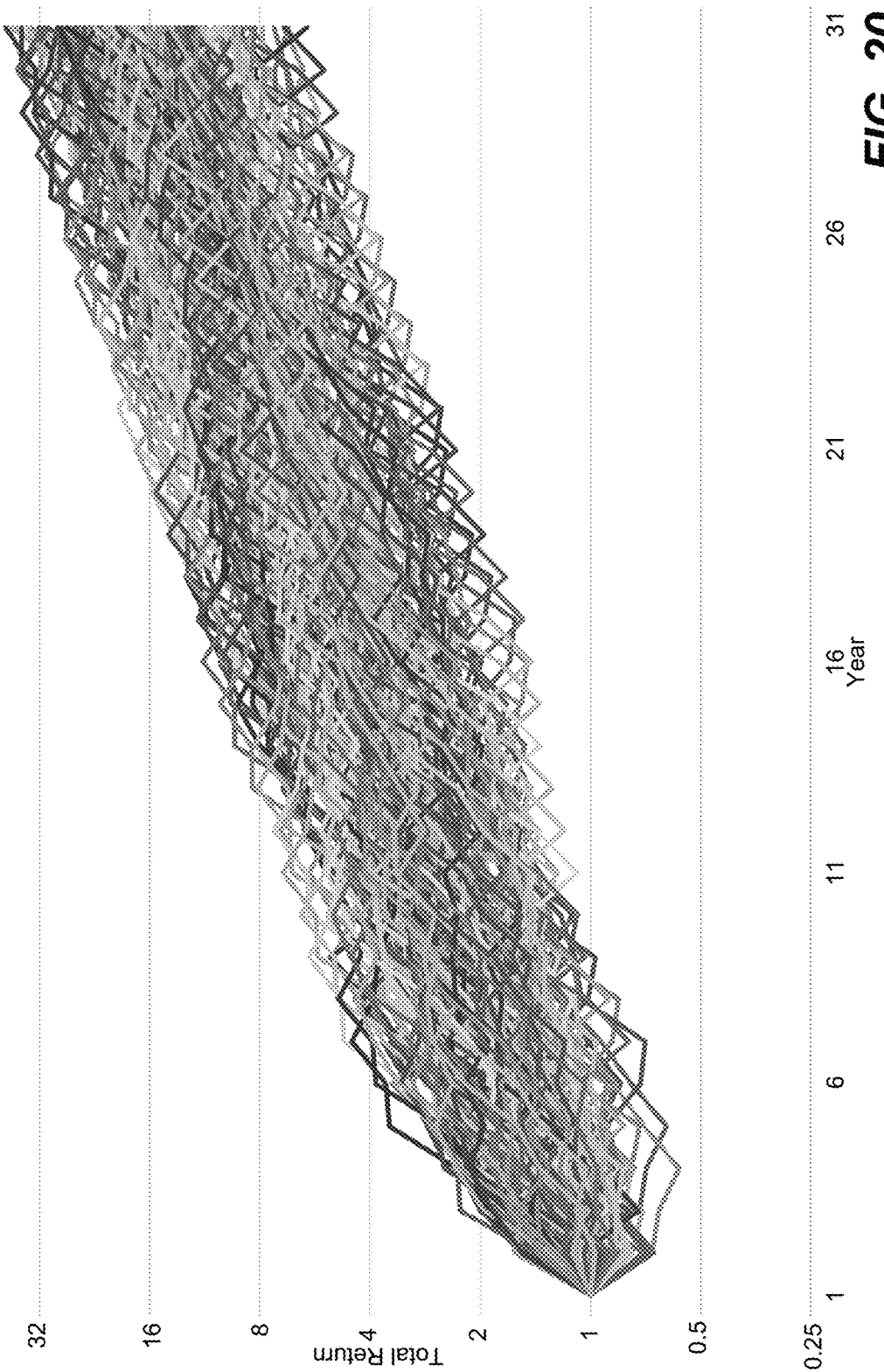
FIG. 20 is a graph illustrating real total return for 30 years of TRU Monte, which is deflection biased based on Date 2, the year 1932, according to an embodiment.
Figure 21:
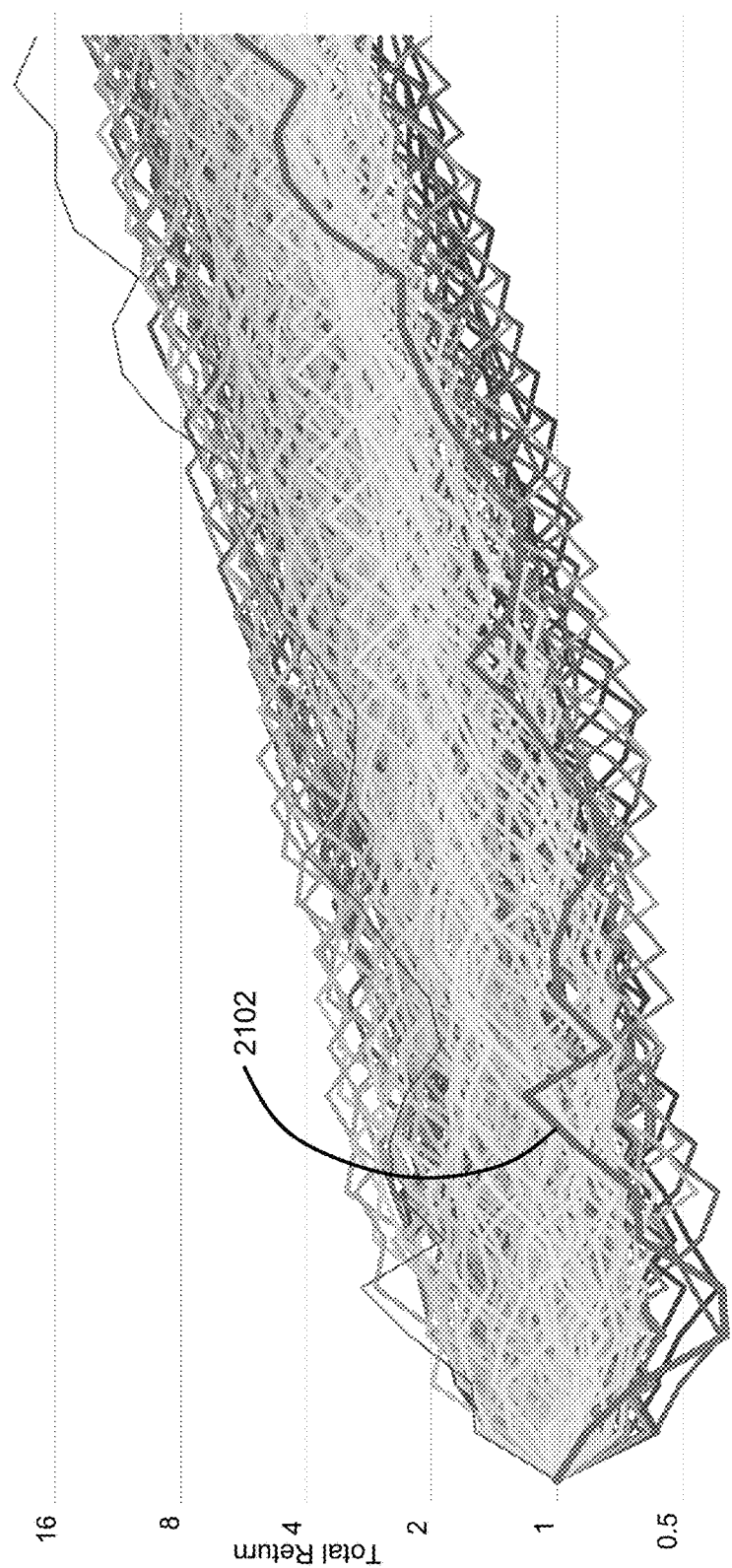
FIG. 21 is a graph illustrating an overlay of the historical 1928 total return with the corresponding biased TRU Monte, according to an embodiment.
Figure 22:
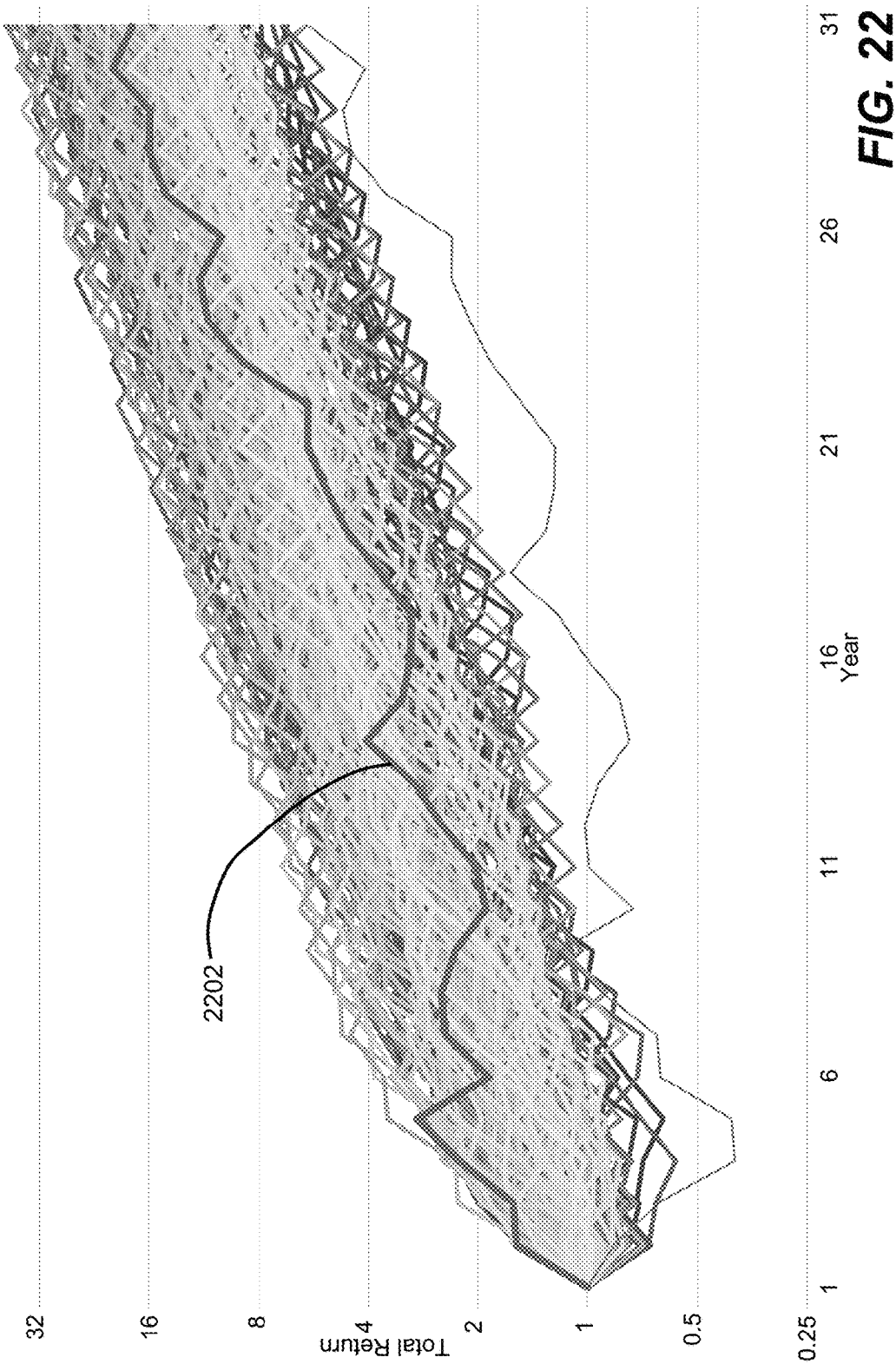
FIG. 22 is a graph illustrating an overlay of the historical 1932 total return with the corresponding biased TRU Monte, according to an embodiment.

FIGS. 18-22 illustrate an example of a reversion adjusted and current TRURatio-biased Monte Carlo analysis. FIG. 18 is a graph illustrating real total return for 30 years of TRU Monte. The impact of reversion adjustment can be seen, but there is no deflection bias. FIG. 19 is a graph illustrating real total return for 30 years of TRU Monte, which is deflection biased based on Date 1, the year 1928. Because the market was overpriced, the returns are lower than normal. FIG. 20 is a graph illustrating real total return for 30 years of TRU Monte, which is deflection biased based on Date 2, the year 1932. Because the market was underpriced, the total returns are higher than normal. FIG. 21 illustrates an overlay of the historical 1928 total return 2102 with the corresponding biased TRU Monte. FIG. 22 illustrates an overlay of the historical 1932 total return 2202 with the corresponding biased TRU Monte. Comparing FIGS. 18-22 to the traditional Monte Carlo analysis of FIG. 11 shows the efficiencies of the present embodiments, e.g., fewer and more accurate results, allowing for quicker processing and less processing resource usage.

Figure 26:
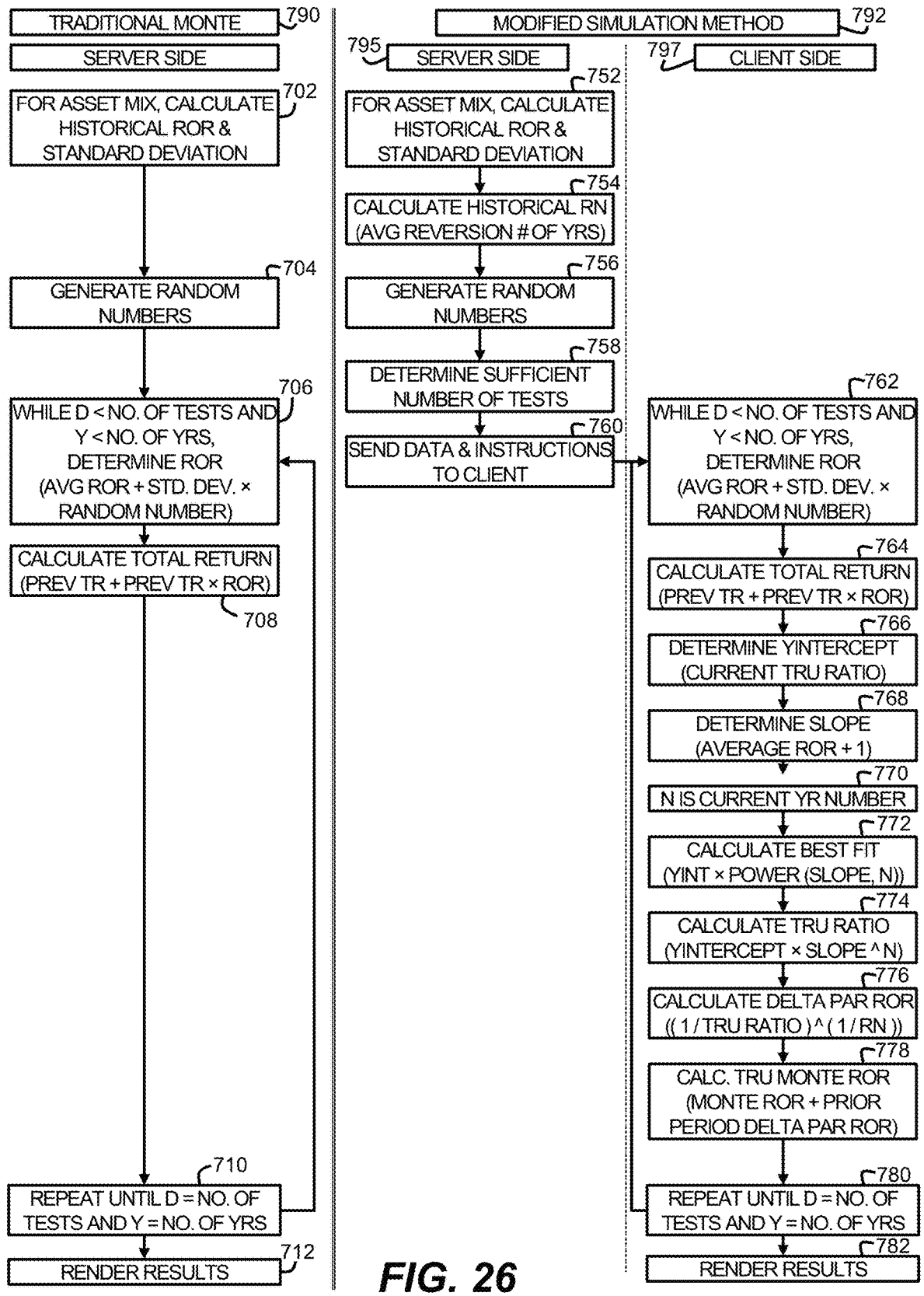
FIG. 26 is a flowchart illustrating exemplary methods for performing traditional Monte Carlo processing and for performing modified simulation processing, according to embodiments.

The present embodiments therefore provide an improved Monte Carlo technique that is reversion adjusted and current TRURatio biased. FIG. 26 demonstrates—with a side-by-side comparison—the differences in processing between the traditional Monte Carlo technique and the modified simulation techniques according to the present embodiments. While both techniques use the average rate of return and standard deviation, the modified simulation technique (TRU Monte) uses additional steps to determine what return will move the asset's total return to the par line or best fit line. The best fit line may be based on the y-intercept of the current TRU Ratio and the slope of the average return. The total return may be divided by the best fit line to calculate the TRU Ratio. The Delta Par may be the return needed to move the total return to the best fit line. This Delta Par ROR may be added to the traditional Monte Carlo ROR to create the TRU Monte ROR.

FIG. 26 illustrates a traditional Monte Carlo method 790 and a modified simulation method 792 according to the present embodiments.

As shown on the left side of FIG. 26, method 790 may begin in step 702 by calculating the average rate of return and standard deviation for a customer's asset mix. For example, if a customer owns 70% stocks and 30% bonds, then for each historical year, the rates of return may be calculated as 0.70*STOCKSROR[Y]+0.30*BONDSROR[Y], where Y indicates the historical year. So, if data were available from the years 1801 to 2014, the calculation would be performed 213 times. Once the asset mix ROR is determined for each historical year, method 790 may calculate the average rate of return and standard deviation of all the historical years.

In step 704, method 790 may continue by generating random numbers, e.g., with a function such as rand( ) In embodiments, the number of random numbers generated is larger than the number of tests desired to be run. So, if 1,000 tests were to be run, 1,050 random numbers may be generated. A function such as rand( ) creates a random number between 0 and 1. Some simple math may be applied to create a distribution of random numbers that is normally distributed. For example, the random numbers may vary from −4 to +4 with 68% being between −1 and +1, 95% being between −2 and +2, and 99.7% being between −3 and +3.

In step 706, method 790 may continue by calculating ROR[MONTE][D][Y] as AVGROR+STANDARDDEVIATION*ZEE[DY], where DY=D+Y.

In step 708, method 790 may then calculate total return. In embodiments, when Y=1, total return equals 1. Otherwise total return is calculated as Previous Total Return+Previous Total Return×ROR[MONTE][D][Y].

In step 710, method 790 may continue by repeating steps 706 and 708 while Y is less than the number of years and D is less than the number of tests, as shown by the return loop in FIG. 26.

If in step 710 Y equals the number of years and D equals the number of tests, then method 790 continues in step 712 by rendering results of the total return. In embodiments, the total return may be rendered as a graph showing the amount along the y-axis and the years along the x-axis.

For comparison purposes, turning now to the modified simulation method 792 on the right side of FIG. 26, method 792 may begin on the server side 795 in step 752 by calculating the average rate of return and standard deviation for a customer's asset mix. For example, if a customer owns 70% stocks and 30% bonds, then for each historical year, the rates of return may be calculated as 0.70*STOCKSROR[Y]+0.30*BONDSROR[Y], where Y indicates the historical year. So, if data were available from the years 1801 to 2014, the calculation would be performed 213 times. Once the asset mix ROR is determined for each historical year, method 792 may calculate the average rate of return and standard deviation of all the historical years.

In step 754, method 792 may continue by calculating the historical RN for each asset. In embodiments, the historical RN may be calculated by counting the number of years that the total return was above the par line and the number of years the total return was below the par line. Then, an average may be calculated of how long the total return was above or below the par line. An RN may be calculated for the customer's asset mix by multiplying the asset RN by the percent of that asset that the customer owns. For example, if the RN of stocks is 8 and the RN of bonds is 20, and the customer's asset mix is stocks 60% and bonds 40%, then the RN would be (8×0.60+20×0.40).

In step 756, method 792 may continue by 704 by generating random numbers, e.g., with a function such as rand( ). In embodiments, the number of random numbers generated is larger than the number of tests desired to be run. So, if 1,000 tests were to be run, 1,050 random numbers may be generated. A function such as rand( ) creates a random number between 0 and 1. Some simple math may be applied to create a distribution of random numbers that is normally distributed. For example, the random numbers may vary from −4 to +4 with 68% being between −1 and +1, 95% being between −2 and +2, and 99.7% being between −3 and +3.

In step 758, method 792 may continue by determining a sufficient number of tests. In embodiments, a sufficient number of tests may be determined by reviewing the random numbers generated. For example, for each test, a SumZee may be calculated. While D is less than number of tests and while Y is less than number of years, SumZee may be the sum of ZEE[DY] where DY=D+Y. Once a SUMZEE[D] has exceeded 0.5 times numyears and a SUMZEE[D] is below −0.5 times numyears, then both may be considered to have a sufficiently high set of random numbers and a sufficiently low set of random numbers. In embodiments, the sufficient number of tests may then be designated as the lowest number of tests by which both a high SumZee and a low SumZee have been achieved. In other embodiments, the sufficient number of tests may be designated as the lesser of: (1) as the lowest number of tests by which both a high SumZee and a low SumZee have been achieved; and (2) designated minimum number of tests needed to create a normal distribution of results. In embodiments, a designated number of tests may be within a range of 400 to 600 tests.

Method 792 may then continue in step 760 by sending to the client side 797 data and instructions for executing the modified simulation. The data may include the random numbers, the average rate of return, the standard deviation, the reversion number of years, and the sufficient number of tests, as determined in the previous steps 752 through 758. The data may be passed from the server side 795 to the client side 797 via user form.

In step 762, method 792 may then calculate, for each test and each year, the ROR[MONTE][D][Y] as the average rate of return plus standard deviation times the random number Zee.

In step 764, method 792 may calculate total return. In embodiments, for the first-year total return when Y=1, TR[TRUMONTE][D][Y] equals 1. Otherwise total return is calculated as Previous Total Return+Previous Total Return× ROR[MONTE][D][Y].

As shown in FIG. 26, the modified simulation method 792 then continues through steps that are distinct from the traditional Monte Carlo method 790. In step 766, method 792 may set the Y intercept to be the current TRU Ratio.

Then, in step 768, method 792 may set the slope to be the average rate of return plus one.

In step 770, method 792 may set N, same as Y, to be the current year number.

In step 772, method 792 may then calculate a best fit, which may be the Y-intercept multiplied by slope^N.

In step 774, method 792 may calculate the TRU Ratio, which may be the total return divided by the best fit.

In step 776, method 792 may then calculate the Delta Par ROR as (1/TRURATIO)^1/RN.

In step 778, method 792 may then calculate the TRU Monte ROR, which may be Monte ROR plus Delta Par ROR.

In step 780, method 792 may continue by repeating steps 762 through 778 while Y is less than the number of years and D is less than the number of tests, as shown by the return loop in FIG. 26.

If in step 780 Y equals the number of years and D equals the number of tests, then method 792 continues in step 782 by rendering results of the total return. In embodiments, the total return may be rendered as a graph showing the amount along the y-axis and the years along the x-axis.

As shown by the comparison of FIG. 26, the present embodiments include processing steps that may limit the number of tests (thereby reducing computing requirements) and may limit the amount of results shown (thereby also reducing computing requirements and improving the accuracy and presentation of realistic results, as described above). In particular, the modified simulation techniques of the present embodiments calculate historical reversion number (RN) at step 754, determine a sufficient number of tests at step 758, and implement the modified Monte Carlo technique at steps 766 through 780, as described above. The traditional Monte Carlo simulations lack these features, as shown on the left side of FIG. 26.

FIG. 23 illustrates an exemplary comparison of nominal total returns results between the present embodiments and other commercially available software products, including MoneyGuidePro™, EasyMoney™, and EMoney™. As shown, the present embodiments provide narrower and more practical ranges of results (shown in the top section of the table), while the other commercially available software products provide extremely wide ranges of results (shown in the bottom section of the table). The wide ranges are unhelpful and confusing for investors because they suggest that results may vary from essentially going broke to amassing many times the value of the investment funds.

Technical Implementation of TRU Monte

Embodiments may provide a software application to apply the TRU Monte to an investor's Net Cash Flow. One implementation may provide a complete financial planning program in which investors and/or their financial planners enter all of the investor's information regarding income, expenses, savings, retirement accounts, etc. From this program, the investor's Net Cash Flow may be calculated.

Another implementation may use existing financial planning programs that complete the information-gathering steps, and provides a TRU Monte software application (e.g., an app or plug-in) with which an investor and/or financial planner receives the Net Cash Flow numbers (e.g., automatically transfers the Net Cash Flow numbers into a web page). After answering a few additional questions, the TRU Monte software application may be run based on the information provided.

FIGS. 27-30 illustrate exemplary software and web applications implementing TRU Monte systems and predictive modeling methods for projecting returns, according to embodiments.

FIG. 27 illustrates an exemplary TRU Monte process and form. In this example, the account balance may be calculated from year 0 to the last year. Account balance for year 0 may be the starting balance, which (referring to information sources 113 of FIG. 1) may be retrieved from a database table or received from financial management software, such as EMoney™. For year 1 to the last year, the account balance may equal prior years account balance plus growth minus gross withdrawal minus fees. The last year may be determined by the number of withdrawals in cashflow field. The gross withdrawal may be the withdrawal for the given year divided by (1 minus tax load). The tax load may be a percentage value in the TRU Monte form. In this example, EMoney™ already subtracts taxes so a value of 0 is used. Fees may be the prior year's account balance times the fee percent. Fee percent may be a percentage value in the TRU Monte form. Growth may be the prior year's account balance times the TRU Monte ROR. This process may be repeated NumTests times, where NumTests is an integer value in the TRU Monte form.

Other information necessary for calculations is show in the TRU Monte Summary Info page shown in FIG. 28. These values may be retrieved from a cash flow database table.

In embodiments, after pressing a calculate button, output is created, such as the results shown in FIG. 29. As shown, those Fail Up Down Results may show the number of tests, and the number of failures where the ending balance is below zero. The maximum and minimum ending balances may also be shown. In the example of FIG. 29, the results for TRU Monte, Traditional Monte, and Historical Date are shown.

Figure 30:
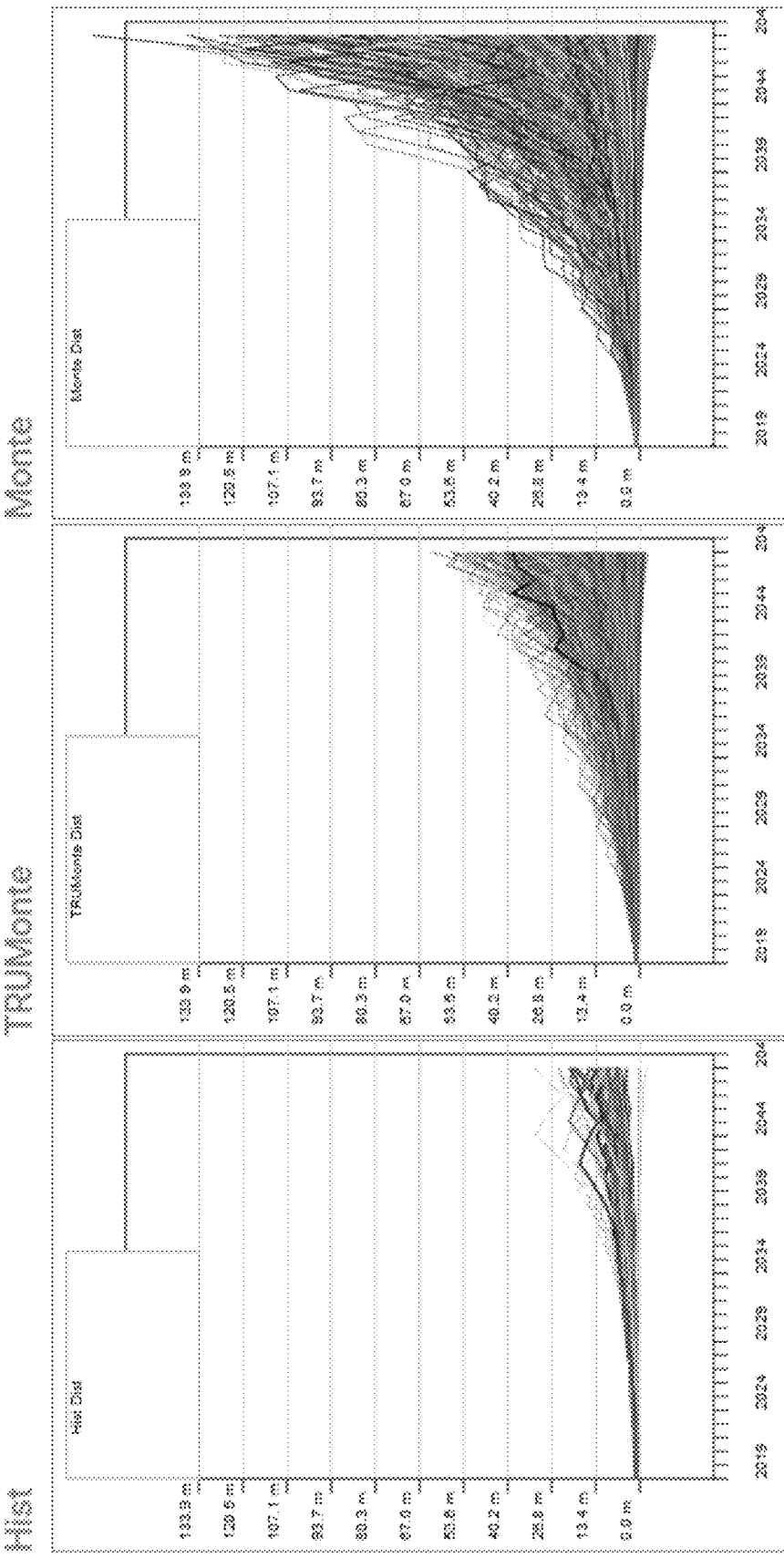

Graphical charts showing the account balances may also be created as shown in FIG. 30.

As described herein, embodiments of modified simulation techniques may allow a client device to operate more efficiently and provide predictive model results faster, with more meaningful and accurate information. Referring to again FIGS. 1-4, in embodiments, predictive modeling processing may be modified to accommodate the particular capabilities of a client device. As explained above, predictive modeling results may include linear projections, historical testing, projections using traditional Monte Carlo analysis, and/or projections using modified simulation techniques incorporating trend reversion and deflection bias. Each of these results may provide a user with data points in reaching decisions. However, to accommodate client device limitations, embodiments may provide an abridged analyses and reporting of results.

For example, referring to steps 410 and 412, a robust client device may be determined to have a more than adequate computing capacity capable of running multiple predictive modeling simulation techniques, including historical testing, traditional Monte Carlo projections, and modified simulation techniques (e.g., TRU Monte). In this case, the data and instructions sent in step 414 may result in calculations, graphical rendering, and display of all three analytical results, an example of which is shown in FIG. 30.

As another example, for a client device with limited computing capacities, it may be determined in step 412 that the client device cannot adequately process all three analytical results, in which case the data and instructions send in step 414 may be based on a modified predictive modeling processing of step 420. That modified processing may, for example, limit the calculations, graphical rendering, and display to only one analytical result, which could be the modified simulation technique (e.g., TRU Monte) shown in the middle graph of FIG. 30.

Other combinations of the predictive modeling results are possible depending on the client device capabilities.

Adapted Client/Server Processing

Referring again to FIG. 4 at step 420, embodiments may tailor predictive modeling processing for a particular client device by adapting client/server processing. FIG. 26 illustrates an example of adapted client/server processing according to embodiments.

Embodiments may provide a modified simulation software application that uses a server-side scripting language, such as PHP, ASP, Visual Basic, Perl, or Python. The modified simulation application may use a MySQL database, or other web-based databases such as PostgreSQL, Mongo, or Access. The application may use JavaScript for client-side scripting, or other scripting languages such as ActionScript, EcmaScript or VBScript.

Embodiments of the modified simulation software application may use several database tables including, for example, an advisor table, an advisor meta table, a cash flow table, and a historical table.

The advisor table may store the name of the advisor, a unique advisor id, advisor email, and advisor password.

The advisor meta table may store information about the advisor such as address and phone number.

The cash flow table may store client information such as the client name and the date the record was created. It also may contain several text block fields that hold key information regarding the financial and timeline details of the customer. A cash flow block may contain a list of the withdrawal amounts that will be deducted. An asset mix block may contain the percentages of assets held by the customer in a pre-ordered sequence. A custinfo1 block may contain basic contact information such as name, address, and phone number. A custinfo2 block may contain financial information such as the starting balance and timeline information such as the customer's age.

The historical data table may contain the rates of return for different assets for the historical years available. It may also contain the current TRURatio for different assets.

In embodiments, different table constructions may be used. For example, the customer's asset mix could be stored in a separate table instead of within the cash flow table.

In embodiments, the modified simulation software application may be configured to be device responsive. That is, what is displayed and how it is displayed may change based on the size of a viewer's device. This responsive design may change design features such as font size, image width, and container width, by reading the device width via javascript or via CSS media queries.

Providing device responsiveness may be challenging in the context of predictive modeling involving many tests. For example, often a simulation may run 1,000 tests or more, which may take an excessive toll on the system that is running the simulation. Often for each given number of tests that are run, additional calculations must also be done 1000 times to calculate averages or render graphs of the results. In an application, the number of times that the 1000 tests are run can be over 20 times.

This large number of calculations can cause the application to exceed the allowed memory size of a device and cause errors, or at least slow download times while the user sees only a blank screen.

As an example, tests run by a modified simulation software application may consume considerable amounts of memory as shown in Table 8 below:

TABLE 8

| | | | | |
|---|---|---|---|---|
| Number of Tests: | 1000 | Memory Get Usage: | 29,326 | kb |
| Number of Tests: | 2000 | Memory Get Usage: | 52,854 | kb |
| Number of Tests: | 3000 | Memory Get Usage: | 77,282 | kb |
| Number of Tests: | 4000 | Memory Get Usage: | 99,686 | kb |
| Number of Tests: | 5000 | Memory Get Usage: | 123,323 | kb |
| Number of Tests: | 6000 | Memory Get Usage: | 148,792 | kb |
| Number of Tests: | 7000 | Memory Get Usage: | 173,085 | kb |
| Number of Tests: | 8000 | Memory Get Usage: | 193,782 | kb |
| Number of Tests: | 9000 | Memory Get Usage: | 221,684 | kb |
| Number of Tests: | 10000 | Memory Get Usage: | 240,807 | kb |

As shown by this example, if 1000 tests are run, the application may use about 29 MB of memory. But if 10,000 tests are run, then the application may use about 240 MB of memory, a considerably higher amount.

To overcome this challenge of memory usage, slow download times, and potential application crashes, embodiments may divide the workload between server-side processing and client-side processing, as shown in the example of FIG. 26.

In embodiments, as shown in steps 752 through 760, much of predictive modeling process may be performed at the server side (e.g., server computing device 112 in FIG. 1). As represented by steps 752 and 754, this may involve the collection of relevant customer information, such as the customer's future withdrawals, starting balance, asset mix, and current age, and the number of years that the customer will be withdrawing income; the collection of historical rates of return and current TRURatio and RN of each investment asset; and the calculation of the standard deviation and average returns for the customer's asset mix.

As represented by step 756, embodiments may also generate random numbers to be used for the modified simulation process. To generate the random numbers, embodiments may perform random number generator calculations for between 1,000 to 10,000 tests.

As represented by step 760, embodiments may then send data and instructions to a client (e.g., mobile device 102 of FIG. 1) and use client-side scripting to calculate results and render graphs. On the client side, embodiments may calculate the customer's account balances, the total return of asset mix, and the number of tests that were successful or failed.

The server-side calculations may be passed to the client side via form fields. For example, the random numbers generated may be passed to a text box that contains the array of random numbers. Other information, such as the customer's starting balance and the average rate of return and standard deviation of the customer's asset mix, may be held in form fields. FIG. 31 is an image of a graphical user interface illustrating exemplary parameters and representative values in the form fields, according to an embodiment. As shown, the parameters and values may include information about the resources of the client device (e.g., clientwidth (display width), clientsystem w h (display width and height), clientplatform (e.g., operating system), and clientbrowser (e.g., type of Web browser)). The parameters and values may also include information about the number of sufficient tests (e.g., Number of Monte Tests and nst), which the server side may have calculated (in this example, as 1371), rounded up, and set to 1400 in the nst form field, with the Number of Monte Tests also set to 1400. The parameters and values may also include other information related to the predictive modeling processing, as shown in FIG. 31.

In embodiments, which items are performed on a server versus a client may also be based on the permanence of the information. For example, a user may want to view what would happen if the starting balance was higher or the rate of return was lower. Those values may be updated temporarily by the user on the client side to see if they produce different results. But permanent changes to the customer's information may require a change to what is stored in the database table, and may therefore involve an update to a server-side page.

In embodiments, therefore, a majority of the calculations may be performed on the server side before pushing out to the client the data and further processing instructions.

While this division of labor may avoid potential memory usage problems of processing everything on the server side, it may pass some of that burden to the client side. While the capacities of client-side processing may be increasing, they are not limitless. Thus, when processing larger numbers of tests, e.g., 5,000 or 10,000, noticeable delays may occur in the rendering of results. In some cases, large amounts of processing pushed to the client-side may actually cause a client device to overheat. Adapting the client/server processing based on the available resources of the client device, as shown in FIGS. 4 and 26, may avoid such situations.

Although FIG. 26 illustrates one method for dividing predictive modeling processing between a server and a client device, other embodiments may adapt to different computational capabilities of a server and/or client device. For example, if steps 410 and 412 of FIG. 4 determine that a thin client device has very limited computational capabilities, the modifications of step 420 may involve shifting portions of the method 792 of FIG. 26 from the client side 797 to the sever side 795. For example, steps 764 through 780 could be completed by the server instead of the client device, and the data and instructions sent by the server to the client device could involve only rendering of graphical and tabular results.

In another embodiment, although not shown in detail in FIG. 4, if steps 410 and 412 of FIG. 4 determine that a robust client device can easily handle the computational demands, step 414 may also determine whether there is a need or desire to shift computational duties from the server to the client device. For example, if the server is supporting a plurality of client devices, it may be beneficial to shift certain computational duties to the client devices that can handle them. Referring to FIG. 26, in embodiments addressing such situations, one or more of steps 752 through 758 may be completed on the client side 797, and the server may just send to the client device the data and parameters needed for completing those processing steps.

Device Responsive Rendering

In embodiments, the modified simulation software application may be configured to be device responsive. That is, what is displayed and how it is displayed may change based on the size of a viewer's device. This responsive design may change design features such as font size, image width, and container width, by reading the device width via javascript or via CSS media queries.

With device responsive rendering, a software application according to the present embodiments may adjust the information displayed on the client device depending on its display resources, which may be categorized as small, medium, and large, as described above. In embodiments, what is displayed and how it is displayed may change based on the display size of the client device. This responsive design may change design features such as font size, image width, and container width, by, for example, reading the device width via javascript or via CSS media queries.

For a large client device, embodiments may display full-size charts and graphs. Those may include graphs of the account balances over time for a historical financial projection, a TRUMonte financial projection, and a Traditional Monte financial projection, as described herein. Those may also include Total Returns over time for the Client's Asset Mix with historical rates of return, with TRUMonte rates of return and Traditional Monte rates of return. Embodiments may also include statistical results, such as the number of failures, number of successes, and the minimum and maximum results achieved, as described herein.

For a small client device, embodiments may render fewer items or different items that would require fewer calculations. For example, the historical results might not display every unique test over time but just one line displaying the final result of all the tests. Or, the historical results might not display every unique test over time but just the highest results and the lowest results.

For a medium client device, embodiments might render most of the items that are rendered for a large client device, but reduce or simplify others.

As an example of modified predictive modeling incorporating device responsive rendering, embodiments may customize the display of graphical or tabular results depending on the size of client device display. For example, for a predictive modeling process involving three simulation techniques (historical, traditional Monte Carlo, and TRU Monte) and a widescreen client device such as laptop computer or tablet, steps 410 and 412 of step 420 of FIG. 4 may determine that the display resources of all the client device are adequate for displaying the graphical results of all three techniques in a single display, e.g., as shown in FIG. 30. On the other hand, for a smaller client device with a limited screen size (e.g., a smartphone), steps 410 and 412 of FIG. 4 may determine that the screen cannot adequately display all three graphical results and may as a result of the modifications of step 420 adjust the output to show each of the graphs separately on the screen, for example, as the user scrolls or swipes the screens to go from graph to graph.

The foregoing disclosure of the embodiments has been presented for purposes of illustration and description. It is not intended to be exhaustive or to limit other embodiments to the precise forms disclosed. Many variations and modifications of the embodiments described herein will be apparent to one of ordinary skill in the art in light of the above disclosure. The scope of the embodiments is to be defined only by the claims, and by their equivalents.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments of the present embodiments, the specification may have presented the method and/or process of the present embodiments as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present embodiments should not be limited to the performance of their steps in the order written, and one skilled in the art can readily appreciate that the sequences may be varied and still remain within the spirit and scope of the present embodiments.

What is claimed is:

1. A method for controlling predictive modeling processes on a mobile device, the method comprising:
    receiving modeling data associated with a predictive model;
    receiving computation resources data of the mobile device;
    determining one or more predictive model processing parameters of the predictive model based on the modeling data and the computation resources data;
    formulating processing instructions based on the one or more predictive model processing parameters;
    sending the modeling data and the processing instructions to the mobile device for execution of the predictive model;
    determining resources of the mobile device allocated to execute the predictive model;
    causing the mobile device to display the determined resources on the mobile device for confirmation to proceed with processing of the predictive model; and
    when the confirmation is received, proceeding with the predictive model.

2. The method of claim 1, wherein the one or more predictive model processing parameters comprises a number of tests.

3. The method of claim 1, wherein formulating processing instructions based on the one or more predictive model processing parameters and sending the modeling data and the processing instructions to the mobile device for execution of the predictive model comprise:
    determining computing resources needed to execute the predictive model based on the modeling data and the one or more predictive model processing parameters;
    determining, based on the computation resources data, whether resources of the mobile device meet the needed computing resources;
    when the resources of the mobile device do not meet the needed computing resources, modifying the one or more predictive model processing parameters to reduce the needed computing resources to accommodate the resources of the mobile device; and
    sending to the mobile device the modeling data and instructions for executing the predictive model based on the modified one or more predictive model processing parameters.

4. The method of claim 1, further comprising:
    when the confirmation is withheld, modifying the one or more predictive model processing parameters to change the resources of the mobile device allocated to execute the predictive model.

5. The method of claim 1, wherein the one or more predictive model processing parameters comprises a type of predictive modeling simulation, and
    wherein formulating processing instructions comprises formulating processing instructions to execute one or more types of predictive modeling simulations within capabilities of the mobile device as defined in the computation resources data of the mobile device.

6. The method of claim 5, wherein the processing instructions comprise executing a single predictive modeling simulation using a modified Monte Carlo simulation biased with trend reversion and current price deflection.

7. The method of claim 1, wherein the one or more predictive model processing parameters comprises a location of processing as between a server side and a client side, wherein the mobile device comprises the client side.

8. The method of claim 1, wherein the one or more predictive model processing parameters comprises rendering of graphical and/or tabular results.

9. A method for controlling predictive modeling processes on a mobile device, the method comprising:
    receiving, at a server computing device, modeling data associated with a predictive model;
    determining, at the server computing device, one or more parameters associated with the predictive model;

determining, at the server computing device, computing resources needed to execute the predictive model based on the modeling data and the one or more parameters;

determining, at the server computing device and/or the mobile device, whether resources of the mobile device meet the needed computing resources;

when the resources of the mobile device do not meet the needed computing resources, modifying, at the server computing device, the one or more parameters to reduce the needed computing resources to accommodate the resources of the mobile device; and sending from the server computing device to the mobile device the modeling data and instructions for executing the predictive model based on the modified one or more parameters.

10. The method of claim 9, wherein the one or more parameters comprises a number of tests for the predictive model, and wherein modifying the one or more parameters comprises reducing the number of tests.

11. The method of claim 9, wherein the one or more parameters comprises a number of tests for the predictive model, and wherein determining the number of tests for the predictive model comprises:

pre-scanning random numbers generated for the predictive model;

designating an upper threshold and a lower threshold;

identifying a first number of tests at which an average of the random numbers for a given test first becomes equal to or greater than the upper threshold and a second number of tests at which an average of the random numbers for a given test first becomes equal to or less than the lower threshold; and designating the number of tests to be either:
(a) the greater of the first number of tests and the second number of tests, or
(b) the greater of the first number of tests, the second number of tests, and a designated minimum number of tests.

12. The method of claim 9, wherein the one or more parameters comprises a type of predictive modeling simulation.

13. The method of claim 12, wherein the modified one or more parameters comprises a modified Monte Carlo simulation.

14. The method of claim 13, wherein the modified Monte Carlo simulation comprises a Monte Carlo analysis biased with trend reversion and current price deflection, which determines a rate of return that will move an asset's total return to a best fit line, wherein the best fit line is based on a y-intercept of a current ratio and a slope of an average return, and wherein the current ratio is determined by the asset's total return divided by the best fit line.

15. The method of claim 9, wherein the one or more parameters comprises an allocation of execution of the predictive model between the server computing device and the mobile device.

16. The method of claim 15, wherein the modified one or more parameters comprises an allocation of more processing of the execution of the predictive model to the server computing device and less processing of the execution of the predictive model to the mobile device.

17. The method of claim 9, wherein the one or more parameters comprises rendering of graphical and/or tabular results.

18. A system for controlling predictive modeling processes on a mobile computing device, the system comprising:

a server computing device in communication with a mobile computing device over a network, wherein the server computing device is configured to:

receive modeling data associated with a predictive model;

receive computation resources data of the mobile computing device;

determine one or more predictive model processing parameters of the predictive model based on the modeling data;

determine computing resources needed to execute the predictive model based on the modeling data and the one or more predictive model processing parameters;

determine, based on the computation resources data, whether resources of the mobile computing device meet the needed computing resources;

when the resources of the mobile computing device do not meet the needed computing resources, modify the one or more predictive model processing parameters to reduce the needed computing resources to accommodate the resources of the mobile computing device; and send to the mobile computing device the modeling data and instructions for executing the predictive model based on the modified one or more predictive model processing parameters.

19. The system of claim 18, wherein the one or more predictive model processing parameters comprises a number of tests.

20. The system of claim 18, wherein the one or more predictive model processing parameters comprises a type of predictive modeling simulation, and wherein the instructions for executing the predictive model based on the modified one or more predictive model processing parameters comprise instructions to execute a single predictive modeling simulation using a modified Monte Carlo simulation biased with trend reversion and current price deflection, which determines a rate of return that will move an asset's total return to a best fit line, wherein the best fit line is based on a y-intercept of a current ratio and a slope of an average return, and wherein the current ratio is determined by the asset's total return divided by the best fit line.

* * * * *